US009959520B2

(12) United States Patent
Endries et al.

(10) Patent No.: US 9,959,520 B2
(45) Date of Patent: May 1, 2018

(54) SYSTEMS FOR ORDERING PRODUCTS

(71) Applicant: Endries International Inc., Brillion, WI (US)

(72) Inventors: Steven Endries, Menasha, WI (US); Edward Todd Fischer, Appleton, WI (US); Patrick Weyenberg, Menasha, WI (US)

(73) Assignee: Endries International Inc., Brillion, WI (US)

( * ) Notice: Subject to any disclaimer, the term of this patent is extended or adjusted under 35 U.S.C. 154(b) by 113 days.

(21) Appl. No.: 14/934,614

(22) Filed: Nov. 6, 2015

(65) Prior Publication Data

US 2016/0350705 A1    Dec. 1, 2016

Related U.S. Application Data

(60) Provisional application No. 62/168,386, filed on May 29, 2015.

(51) Int. Cl.
*H04Q 5/22* (2006.01)
*A47B 81/00* (2006.01)
(Continued)

(52) U.S. Cl.
CPC ....... *G06Q 10/087* (2013.01); *G06K 7/10415* (2013.01); *G06Q 10/00* (2013.01);
(Continued)

(58) Field of Classification Search
CPC ................. G06Q 10/08; H04Q 5/22
See application file for complete search history.

(56) References Cited

U.S. PATENT DOCUMENTS 5,664,110 A    9/1997  Green et al.
6,169,483 B1 *  1/2001  Ghaffari ............... G06Q 10/087
                                            340/568.1
(Continued)

FOREIGN PATENT DOCUMENTS

WO    2006136350    12/2006

OTHER PUBLICATIONS

Wilding et al., "RFID Demystified: Part 3 Company Case Studies", Centre for Logistics and Supply Chain Management Logistics & Transport Focus, vol. 6 No. 5, Jun. 2004, pp. 32-42. (Year: 2004).*
(Continued)

*Primary Examiner* — Mark A Fadok
(74) *Attorney, Agent, or Firm* — Thomas D. Wilhelm; Northwind IP Law, S.C.

(57) ABSTRACT

Product replenishment systems which identify to vendors need for replenishment product, and effect shipment of such product. Product containers have computer readable labels which identify particular product to those containers. When a container is empty, the container is tossed into a chute. An antenna subassembly, including antenna, antenna tuner, and signal reader, reads the label as the container passes through the chute. The container label can alternatively be read by otherwise moving the label across the field of a suitable antenna, or by reading such label using a bar code reader. The antenna, or bar code reader, communicates label information to a local computer. The local computer communicates, to a separate host computer, certain of the label information. The host computer collects information from one or more local computers and communicates with respective vendor computers which receive the information, and process and instruct shipment orders related to the needed product.

36 Claims, 12 Drawing Sheets

(51) Int. Cl.

| | | |
|---|---|---|
| *G06Q 10/08* | (2012.01) | |
| *G06Q 30/06* | (2012.01) | |
| *G06K 7/10* | (2006.01) | |
| *G06Q 20/18* | (2012.01) | |
| *H01Q 1/22* | (2006.01) | |
| *G06Q 10/00* | (2012.01) | |

(52) U.S. Cl.
CPC ........... *G06Q 10/08* (2013.01); *G06Q 10/083* (2013.01); *G06Q 10/0833* (2013.01); *G06Q 10/0835* (2013.01); *G06Q 20/18* (2013.01); *G06Q 30/0635* (2013.01); *H01Q 1/22* (2013.01)

(56) References Cited

U.S. PATENT DOCUMENTS

| | | | | |
|---|---|---|---|---|
| 8,113,424 | B2* | 2/2012 | Philippe | G06F 19/327 235/375 |
| 8,231,053 | B2 | 7/2012 | Linton et al. | |
| 8,362,878 | B2* | 1/2013 | Molewyk | D06F 93/00 312/211 |
| 8,461,962 | B2* | 6/2013 | Philippe | G06Q 10/087 235/385 |
| 9,511,945 | B2* | 12/2016 | Greyshock | B65G 35/00 |
| 2002/0063033 | A1* | 5/2002 | Ben-Naim | G07F 7/06 194/214 |
| 2004/0158507 | A1 | 8/2004 | Meek, Jr. et al. | |
| 2005/0149414 | A1 | 7/2005 | Schrodt et al. | |
| 2006/0226988 | A1* | 10/2006 | Ernst | G06Q 30/02 340/572.1 |
| 2006/0290471 | A1* | 12/2006 | Van Alstyne | G06Q 10/08 340/10.1 |
| 2007/0011041 | A1* | 1/2007 | Bourne | G07G 1/009 340/572.3 |
| 2007/0023512 | A1 | 2/2007 | Miller et al. | |
| 2008/0055088 | A1 | 3/2008 | Fabre et al. | |
| 2010/0134251 | A1* | 6/2010 | Philippe | G06Q 10/087 340/5.92 |
| 2011/0084135 | A1* | 4/2011 | Philippe | G06F 19/327 235/385 |
| 2011/0304433 | A1* | 12/2011 | Molewyk | D06F 93/00 340/10.1 |
| 2013/0126611 | A1* | 5/2013 | Kangas | G06K 7/10178 235/385 |
| 2013/0134843 | A1* | 5/2013 | Molewyk | A47B 81/00 312/198 |
| 2014/0262690 | A1* | 9/2014 | Henderson | B60M 1/305 198/602 |
| 2015/0127362 | A1* | 5/2015 | DeBusk | G06F 19/328 705/2 |

OTHER PUBLICATIONS

Healthmark, The Right Medication, The Right Dose, The Right Patient, website, Retrieved from internet Jun. 19, 2015, 1pg.
Healthmark, The INTELLIGAURD Patient Bedside Reader, website, Retrieved from internet Jun. 19, 2015, 2 pg.
Healthmark, ADC Drawer Configuration, website, Retrieved from internet Jun. 19, 2015, 2 pg.
Healthmark, Encoding, Printing and Tagging, website, Retrieved from internet Jun. 19, 2015, 2 pg.

* cited by examiner

SYSTEMS FOR ORDERING PRODUCTS

BACKGROUND

This invention pertains to maintaining an adequate supply of one or more materials, parts, products which are consumed on a regular basis.

For example, in assembly operations, certain products, parts, and pieces which are used on a regular basis may be fabricated at the same facility where an assembly is assembled; while other parts and/or pieces which are used in assembly operations on a regular basis are ordered from outside vendors. If an assembler runs out of even small or minor parts and/or pieces, such as nuts, bolts, washers, screws, brackets, bearings, or the like, some or all of the entire assembly operation may have to be shut down until such time as a replenishment supply of the respective part or piece is received, inspected, cataloged in, and ready to be used.

As an example of current practice, small parts regularly used in assembly operations are commonly stored in plastic bins or metal bins. A typical bin has an open top and a partially open front wall. A worker on the assembly line can retrieve parts from a given such bin in the rack through the open front and/or top of the respective bin. Each bin has a label or sticker, typically mounted on the front wall of the bin. The label or sticker has a readable bar code which can be read by a bar code scanner/reader, as well as having text which corresponds to at least some of the information identified by the bar code. The bar code identifies the particular Stock Keeping Unit (SKU) of the piece/part which is to be available from that particular bin. The respective text on the label or sticker provides the same or similar information as is stored in the bar code. Accordingly, the approved content of the bin can be determined either electronically by reading the bar code, or manually by a person reading the text.

Such bins are commonly stored/housed, side-by-side in a rack at or near the assembly operation. A typical such rack has multiple rows of shelving. Bins to hold/contain the different parts are positioned side by side on the respective shelves. The fronts of the bins are facing toward the work spaces of workers who draw parts from the bins. Thus, a plurality of rows of bins is arranged on the respective shelves, and the bins face toward the work space of the respective worker's who draw parts from the respective bins. A given rack, accordingly presents an X-Y matrix/array of bins to one or more workers, where each bin has a specific identity linked to a specific part/product which is to be temporarily stored/housed in that particular bin, and where a worker can draw parts from the array of bins in the process of assembling products; with confidence that the correct part for the then-current assembly step is in the bin labeled for that particular part.

The issue being addressed by this invention is the systems and methods used to replenish the parts/pieces in the bins in order to make sure that the parts/pieces needed for the assembly operation are always available in a given bin space when and as needed, and that each bin contains only parts for which that bin is labeled, while still controlling/limiting the inventory of parts/pieces in the respective bins.

Failure of timely replenishment of parts to the correct bins can result in lost productivity on the assembly line. However, having more inventory than necessary in the proximity of the assembly operation imposes unnecessary additional fixed investment/capital cost on the end user entity/company which is carrying out the assembly operation. In addition, the additional inventory takes up valuable space in the manufacturing facility.

In medical operations, certain products have relatively short shelf lives, and must be replenished in a timely manner before expiration of the shelf life of the respective product. As an example, products comprising, or derived from, human blood have known shelf lives; however, because of issues of availability of the raw material whole blood, and the time necessary to obtain, process, test, confirm, catalog, and label the raw material and the resulting consumable product, it is essential to have such products on hand when the need for such products arises.

The issue in the medical community is the systems and methods used to replenish e.g. blood supplies. Failure of timely replenishment can result in loss of human life.

And while the medical community has redundant communications systems continuously connecting various operating facilities to each other, further redundancy may be obtained by having the ability to store certain need information and product use information, at a site where products are expected to be used/consumed; and then, if/when such continuous communications connections fail or are otherwise out of service, to transmit such need information and/or product information, to a supplier/vendor over the internet as connection to the internet becomes available.

Referring again to industrial assembly operations, two or more bins of parts/pieces may be used for each SKU. Where two or more bins are so used, it is known for assembly workers to first use all the parts, pieces from a first bin, to then toss the empty bin into a receptacle, and to then start drawing parts/pieces from the second bin while awaiting shipment, arrival of replenishment parts, pieces for the first bin. Periodically, a vendor service representative comes to the using/assembly facility and uses e.g. a hand-held scanner to read the bar code tags on each bin in the receptacle, thus to read all of the empty bins in the receptacle. The tags so read are then communicated to a computer at an order processing facility, optionally a vendor facility, optionally to or through a cloud computer, where the bar code tags which were read become source information at the vendor facility, and authorization for processing orders and shipping product to the assembly operation customer/user from one or more source locations.

Where a single bin is used for each SKU, it is known to place each bin on a scale. The assembly workers observe the weights of the respective scales and when the weight on a given scale, representing e.g. a single respective bin or SKU, falls below an identified threshold weight, an assembly worker manually places an order for replenishment parts.

In the alternative, an optical beam can be directed across the bin to an optical sensor, and when the quantity of parts in the bin is low enough to expose the sensor to the beam, the sensor can initiate a signal, such as a light on the front of the bin, to alert a worker that additional parts/pieces should be ordered for the respective bin.

Also where a single bin is used for at least some of the parts/pieces, it is known for a vendor service representative to periodically come to the assembly facility and observe the levels of parts in the bins. The service representative uses his/her judgment, and knowledge of rates of use of parts/pieces from the respective bin, or the historical record of use rates from that bin, to manually, mentally, subjectively determine which bins need replenishment parts/pieces. The service representative then uses a scanner to manually scan the respective bins needing replenishment, and transmits the scanned information to a computer at an order-processing facility where the order is processed and shipped.

As another alternative, where a single bin is used for each SKU, it is known to place a strip of horizontally-extending e.g. brightly colored tape on the inside, or outside, of the bin at a predetermined elevation on the bin. When the level of parts/pieces in the bin drops below the strip of tape, an assembly worker manually enters an order for replenishment product/parts/pieces.

A common issue in all of the above known systems and processes is that replenishment of parts, or pieces, or products, depends on a worker, whether an assembly worker or a vendor service representative, periodically, mentally remembering to make, and making, a determination regarding which bins need replenishment parts or which particular products need to be ordered.

An additional issue is that, in some of the above known processes, several days can pass between workers making such determinations, whereby a period of time passes between the time when a bin first shows a need for replenishment, and the time when a worker actually recognizes that replenishment is needed.

Another issue where a single bin is used for a particular SKU is that product/parts/pieces from a given order, shipment are mingled with product/parts/pieces from a previous order, shipment. Where it is determined that some of the parts/pieces were defective, enough to justify/require a product recall, or a warranty claim, the mingling of parts/pieces from multiple deliveries of parts/pieces, to bins, prevents the party responsible for assembly operations from determining, with a high degree of accuracy, the time period in which defective assemblies were being assembled using the defective parts/pieces. Accordingly, in order to have a high degree of certainty that all of the defective assemblies have been recalled, or identified for warranty purposes, the party responsible for the assembly operation recalls assemblies which were assembled both substantially before and substantially after the defective parts were known to be in the respective bin.

Accordingly, it is desirable to provide a system wherein the time period in which defective parts were being used from a given bin can be identified with a high degree of certainty without also including substantial time periods where defective parts/pieces may not have been used.

It is further desirable to provide a more timely transmission of information to the vendor order-processing facility that replenishment of a given product SKU is needed.

It is also desirable to provide improved methods of collecting and transmitting information to the vendor order-processing facility indicating that replenishment of a given product SKU is needed.

It is also desirable to provide systems and methods for collecting and transmitting replenishment order information, which systems are less reliant on human judgment regarding which bins/SKU's need replenishment.

It is further desirable to provide systems and methods which better segregate and track replenishment parts, by lot number, to the bin level of distribution so as to be able to better, more narrowly, bracket the number of assemblies which should be recalled, or identified for warranty purposes, when a determination is made that certain ones of the parts used from a given bin may have been defective.

It is also desirable to provide, as part of the systems and methods, a back-up procedure whereby an order can be manually entered into the ordering system.

SUMMARY

This invention provides an inventory management and replenishment system, and methods, which can identify, to a vendor, and communicate to such vendor, a need for replenishment product, in a more timely manner when the on-hand supply of parts or pieces or product falls below a predetermined threshold. Such threshold is typically related to the emptying of a bin or other container. The threshold can, in the alternative, be a partial emptying of a bin or other container. By so timely communicating to the vendor, and assuming timely shipment of replenishment product by the vendor, the user can operate satisfactorily with less inventory, thus better controlling capital investment and use of space in the manufacturing facility.

As used herein, "bin" is used as an example which refers to a wide variety of types of containers which are used for temporarily storing parts or pieces at a use location, commonly in a commercial facility where such parts or pieces are ultimately consumed, used as part of a system, an assembly, a process, or an operation.

One type of container, which holds multiple units of an assigned piece or part, commonly has an open top, and, relative to left and right side walls and a rear wall, a reduced-height front wall. Accordingly, parts or pieces can be retrieved from such containers either through the open top or through an open portion of the front wall generally toward the top of the front wall.

Another type of container is a single-use container, such as a bag of liquid blood or a liquid product derived from liquid blood, wherein all content of the container which is ultimately used is used in a single ongoing withdrawal of product from the bag.

The invention provides a two-or-more-container system, as well as the ability to operate with some part numbers stored in single containers. A receptacle is provided to receive temporarily empty containers. Each container is equipped with an electronically readable indicia, such as a bar code label and/or an RFID chip, which is optionally identified to a host computer controlled by a vendor, or other entity acting on behalf of the vendor, optionally to or through or in the internet cloud. In the alternative, the host computer may be controlled by an independent third party. The electronically readable indicia on the container identify the specific container to a local computer. The local computer matches the container number or other identification information to certain product information relating to the product which is to be contained/housed in that particular container, as well as, optionally to the customer information relating to that container.

Optionally, each container is equipped with one or more RFID tags as well as a bar code label, both of which are identified to the host computer. The RFID tags and the bar code label both identify the specific container as well as the product SKU for the product to be contained in that container.

A chute is mounted over the container-receiving receptacle. The chute contains an antenna subsystem, including an RFID reader, a corresponding transmitting and receiving antenna, and an antenna tuner. A local computer is electronically connected to the antenna subsystem so as to receive read inputs from the antenna subsystem. A computer display screen, typically located adjacent the chute, optionally attached to the chute, provides a read-out/display of the information received by the computer. A bottom wall of the chute is angled, from the front of the chute, downwardly to the rear such that a container tossed into the chute passes through the chute, toward the rear of the chute, and ultimately falls into the receptacle. The dimensions of the chute and the power output of the antenna are cooperatively specified such that the effective range of the antenna signal, as broadcast by the antenna, is contained within the left-to-right, top-to-bottom, and front-to-back dimensions of the chute. An e.g. portable bar code reader can be kept at the chute location, optionally housed in the chute housing.

Where parts of a particular SKU are being temporarily stored in e.g. first and second containers, parts are used exclusively from the first container until all of the parts from that first container have been used.

When the last parts in a particular container have been used, or otherwise removed from the container, the container is empty. An e.g. assembly worker removes the empty container from the rack/shelf and tosses the empty container into the chute. As an alternative and/or as a back-up method of reading the identity of the container and the product/SKU to be contained in that container, the portable/hand-held bar code reader can be used to read the bar code on the container label which is on the front wall of the container, and to thereby transmit the bar code so read, to the local computer.

The assembly worker then begins using parts/pieces from the second container of the at least two-container system for that particular parts/pieces SKU at the work station.

With the RFID reader, the local computer, the tuner, and the antenna powered on, and set in operations mode, and with the tuner tuning the antenna, as the assembly worker tosses an empty container into the chute, the antenna is transmitting a signal which can be passively received by the one or more RFID tags on the container. The antenna receives a reflected, passive, signal from the one or more RFID tags on the container and transmits the received signal to the RFID reader. The RFID reader reads the respective one or more signals received from the antenna, and transmits the read signal(s) to the local computer. The read signal has signal characteristics specific, unique to the particular container. The local computer stores, in electronic memory, the signals which have been read.

Periodically, at predetermined intervals, such as once per minute, the local computer accesses the internet through an internet portal and communicates enough of the information from the read RFID signals or bar code signals, to an off-site system management computer, optionally to or through a cloud computer, optionally at a vendor facility, to enable the order-processing computer to initiate and process an order. The off-site computer converts the signal, so received from the local computer at the user's facility, and processes the signal, optionally through one or more additional computers, into an order for replenishment parts/pieces/products designated to the specific containers, by e.g. container number, to replenish the inventory in the specific containers.

The system management computer may operate as an order-processing computer, or may transmit the read signals to a different vendor-controlled order-processing computer.

The order can then be processed by the vendor and shipped in a timely manner, for example within 24 hours. Each unit of product shipped by the vendor can optionally be identified, e.g. by bar code label, according to the lot in which that product was manufactured or otherwise processed by a supplier.

When the replenishment product arrives at the user's facility, a worker at the user's facility scans the bar code on the replenishment product package with an e.g. wireless bar code scanner/reader, which transmits the bar code information to the local computer. The local computer stores the bar code information, which includes both the SKU for the product identification as well as, optionally, the manufacturers lot number. The worker then begins sequentially scanning the empty containers. When the local computer senses a match between the product identity on the bar code of the replenishment package and the bar code on an empty container which has been read, the local computer signals the match between the bar code/SKU on the container and the bar code/SKU on the product replenishment package.

Once the matching container has been identified by the computer, the worker places the replenishment product, from the replenishment package, into the so-identified empty matching container. The lot number, if used and recorded, is then transmitted back to the vendor, e.g. to the order-processing computer for at least temporary retention.

By tracking and matching, and recording, the product lot number from the replenishment product package to the particular empty container at the time replenishment product is placed in the container, and then keeping track of when that container was again read by the local computer when the container was subsequently tossed into the chute, the vendor can identify, to the user, both the beginning and the end of a particular time period when parts from that lot/package were first used in the assembly operation and the time when all of those parts, from that lot, had been used. Further, by keeping track of, and saving the data from when that container, or a different container using the same product SKU and lot number, was read while passing through the chute or was read by the bar code reader, the time period when the particular product lot was being used in the assembly operation can be identified with a relatively high degree of certainty, and so limit the number of assemblies which might be subject to recall, or warranty supplementation if defective parts were later discovered to have been used from the respective container or containers.

In a first family of embodiments, the invention comprehends a system for managing a consumable parts inventory at one or more use locations for such parts, the system comprising an antenna, the antenna comprising an antenna loop, extending about an antenna perimeter, an opening extending through the antenna loop, thereby defining a path through the antenna loop, the opening having a cross-section adapted to receive, therethrough, along the path, a container having thereon a computer-readable tag, the antenna transmitting signals which can affect such computer-readable tag; a signal reader capable of reading a response signal received from such computer-readable tag; and a computer subsystem, the computer subsystem receiving read signals from the signal reader, processing orders based on the read signals, and effecting shipment of appropriate ones of the orders to the respective one or more use locations.

In a second family of embodiments, the invention comprehends a system for capturing and processing information from a computer-readable tag on a container which is adapted and configured to hold consumable products, the system comprising an antenna having a front and a rear, the antenna being adapted and configured to transmit an antenna signal having a front-to-rear effective signal range, and a transverse effective signal range, and to receive responses to such transmitted signal, the antenna comprising an antenna loop extending about an antenna perimeter, an opening extending through the antenna loop, from the front of the antenna to the rear of the antenna, thereby defining a front-to-rear path through the antenna loop, the opening having a cross-section adapted to receive such container therethrough along the front-to-rear path; and a signal reader adapted and configured to read response signals received from such computer-readable tag by the antenna and communicated from the antenna to the signal reader.

In some embodiments, the system further comprises a kiosk having a front, a rear, a left side, a right side, a top, and a bottom, all collectively defining a three-dimensional physical space encompassed by the physical dimensions of the kiosk, the kiosk extending about, and transversely outwardly from, the antenna loop, including extending transverse to the front-to-rear path through the antenna loop, far enough that the transverse effective range of the antenna signal is confined within physical dimensions of the kiosk.

In some embodiments, the kiosk extends frontwardly of the front of the antenna loop and rearwardly of the rear of the antenna loop, far enough that an entirety of the effective range, both front-to-rear range and transverse range, of the signal transmitted by the antenna, is confined within the three dimensional physical space defined by the kiosk.

In some embodiments, the system further comprises a speed controller which limits speed of movement of a respective container along the front-to-rear path through the antenna loop.

In some embodiments, the system further comprises a local computer in communication with the signal reader, the signal reader being adapted and configured to communicate tag response information, based on the response signals so read, to the local computer.

In some embodiments, the system further comprises a host computer in communication with the local computer, the local computer being adapted and configured to communicate at least a portion of the tag response information so received from the signal reader, to the host computer.

In some embodiments, the system further comprises an order-processing computer in communication with the host computer, the host computer being adapted and configured to communicate at least a portion of the tag response information, so received from the local computer, to the order-processing computer.

In a third family of embodiments, the invention comprehends a multiple-container system for placing replenishment orders for different types of commonly-stocked consumable products with a vendor for such consumable products, at least first and second containers being provided for respective ones of the commonly-stocked consumable products, the system comprising, at a use location at a user facility, at least first and second containers for a first type of such consumable products, each of the at least first and second containers having thereon a computer readable tag, each such tag, and thus the respective containers, as well as a particular one of the consumable such products to be used at that use location, having been identified to electronic memory; an antenna subsystem at the user facility, the antenna subsystem including antenna structure and an antenna tuner, collectively adapted and configured to continuously transmit a signal which can be received by a such computer-readable tag, and in response to which, the computer readable tag can emit a response signal, the antenna subsystem further being adapted and configured to receive such response signal from the computer-readable tag, the to read such response signal, and to generate computer-readable information pertaining to such tag based on such response signal; and a computer subsystem, having a processor and a memory, and including a local computer, at such user facility, the computer subsystem being adapted and configured to receive, from the antenna subsystem, and to store in electronic memory, such computer-readable signal information related to such response signal, to compare the response signal information so received with container-related information in electronic memory available to the computer subsystem, to identify and retrieve information relating to the container which was read, including identity and quantity of the respective product to be shipped, and to process an order, and effect shipment of such order for the respective product to the respective user facility, marked for delivery to the use location, and marked for identification with one of the at least first and second containers.

In some embodiments, the computer subsystem comprises at least one local computer, and a host computer connected, at least intermittently, to the at least one local computer, the host computer receiving at least a portion of the response signal information from the at least one local computer.

In some embodiments, the local computer including a display at the use location.

In some embodiments, the antenna subsystem includes the antenna structure, the antenna tuner, and a signal reader, the signal reader optionally being disposed at the use location.

In some embodiments the system further comprises, at the use location, a kiosk structure, the antenna being disposed inside the kiosk structure.

In some embodiments, the antenna structure includes an antenna loop, and an opening extending through the antenna loop, thereby defining a path through the antenna loop.

In some embodiments, the system further comprises an opening, in the kiosk, aligned with the path through the antenna loop so as to enable moving a container through the kiosk opening and correspondingly through the antenna loop.

In some embodiments, the host computer is connected to, and receives response signal information from, a plurality of local computers.

In some embodiments, at least first and second ones of the plurality of local computers service at least respective first and second customer entities of a single vendor.

In some embodiments, the plurality of local computers service at least first and second different customer entities for each of at least respective first and second different vendors.

In some embodiments, the host computer, upon receipt of tag response signal information retrieves, from electronic memory, enough information related to the respective container to determine which vendor is to receive the respective tag response signal information, and communicates such tag response signal information to only that respective vendor.

In some embodiments, the system further comprises an order-processing computer, the order-processing computer being adapted and configured to receive at least a portion of the response signal from the host computer.

In some embodiments, the order-processing computer is controlled by a vendor for the respective consumable product in the at least first and second containers.

In some embodiments, the order-processing computer receives less than all product-related information contained in the container-related information generated by the local computer.

In some embodiments, the order-processing computer processes and effects shipment of the respective product replenishment order, and receives, from the host computer, as identification of the container which was read, only container identification indicia.

In some embodiments, certain details of order replenishment shipments, by the order-processing computer, are shielded from the local computer and the host computer.

In some embodiments, the local computer has stored, in electronic memory, enough information about the tag to determine, from the tag response signal information, the identity of the consumable product, so as to facilitate display of product information, corresponding to the read container on a computer display screen proximate the use location, optionally enough information to determine the quantity of product to be shipped in a replenishment order.

In some embodiments, the computer readable tag comprises an RFID chip which uses power from the signal transmitted by the antenna to generate the response signal.

In some embodiments, the system further comprises a computer readable bar code on the first and second containers, in addition to the RFID chip.

In some embodiments, the order-processing computer has stored, in memory, lot numbers and selected dates for selected shipments of replenishment product, as confirmed by the respective local computers upon receipt of respective shipments of replenishment product.

In a fourth family of embodiments, the invention comprehends a method of capturing and processing information from a computer-readable tag on a container which is adapted and configured to hold consumable products, and to have such consumable products replenished when the container has been emptied, the method comprising using an antenna transmitting an antenna signal having an effective signal range, the antenna comprising an antenna loop extending about an antenna perimeter, an opening extending through the antenna loop, from a front of the antenna loop to a rear of the antenna loop, thereby defining a front-to-rear path through the antenna loop, the opening having a cross-section adapted to receive such container therethrough along the front-to-rear path, passing a such container through the antenna loop at a speed which enables the antenna signal to activate the computer readable tag on the respective container as the container is passing through the antenna loop, the computer-readable tag receiving the signal transmitted by the antenna and emitting a tag response signal, receiving the tag response signal emitted by the computer-readable tag, and a signal reader reading the response signal.

In some embodiments, the method further comprises providing a kiosk having a front, a rear, a left side, a right side, a top, and a bottom, all collectively defining a three-dimensional physical space encompassed by physical dimensions of the kiosk, the kiosk extending about, and transversely outwardly from, the antenna loop, including extending transverse to the front-to-rear path through the antenna loop, and thereby confining, within the physical dimensions of the kiosk, a transverse portion of the effective range of the antenna signal.

In some embodiments, the method further comprises designing the kiosk to extend frontwardly of the front of the antenna loop and rearwardly of the rear of the antenna loop, far enough to confine the entirety of the transmitted antenna signal, both front-to-rear, and transversely, within the three dimensional physical space encompassed by the physical dimensions of the kiosk.

In some embodiments, the method further comprises positioning a speed controller along the front-to-rear path of movement of a respective container through the antenna loop, and thereby limiting speed of movement of the container through the antenna loop.

In some embodiments, the method further comprises providing a local computer in communication with the signal reader, the signal reader communicating tag response information, based on the tag response signals so read, to the local computer.

In some embodiments, the system further comprises providing a host computer in communication with the local computer, the local computer communicating at least a portion of the tag response information received from the signal reader, to the host computer.

In some embodiments, the system further comprises providing an order-processing computer in communication with the host computer, the host computer communicating at least a portion of the tag response information so received from the local computer, to the order-processing computer.

In a fifth family of embodiments, the invention comprehends a method for placing replenishment orders for different types of commonly-stocked consumable products with a vendor for such consumable products, at least first and second containers being provided for respective ones of such commonly-stocked consumable products, the method comprising, using computer readable tags identifying, to electronic memory, at least first and second such containers, including respective container identification indicia, each such container to be used at a use location with a particular one of the consumable products, the computer readable tags being attached to the at least first and second containers, both the computer readable tags and the respective at least first and second containers thus being associated with the particular consumable product in such electronic memory, at a use location at a user facility, stocking the first and second containers with the particular one of the consumable products; using an antenna subsystem, transmitting a signal which can be received by a such computer-readable tag, in response to which, such computer readable tag can emit a tag response signal; the antenna subsystem receiving the tag response signal from the computer-readable tag, reading the tag response signal, and generating computer-readable information pertaining to the tag so read, based on the tag response signal; and a computer subsystem receiving the generated computer-readable information, related to the tag response signal, from the antenna subsystem, and storing such received information in electronic memory, comparing the computer-readable information so received with container-related information in electronic memory available to the computer subsystem, identifying and retrieving information relating to the container which was read, including identity and quantity of the respective consumable product to be shipped, and processing an order, and effecting shipment of such order for the respective replenishment product to the respective user facility, marked for delivery to the use location, and marked for identification with one of the at least first and second containers.

In some embodiments, the computer subsystem comprises at least one local computer, and a host computer connected, at least intermittently, to the at least one local computer, the host computer receiving at least a portion of the response signal information from the at least one local computer.

In some embodiments, the local computer displays confirmation information relating to the tag response signal at the product use location.

In some embodiments, the antenna subsystem includes the antenna structure, which is tuned by an antenna tuner, and a signal reader reads the response signal received from the computer readable tag.

In some embodiments, the method further comprises mounting the antenna inside a kiosk structure at the use location, optionally defining outer dimensions of the kiosk structure, and tuning the antenna signal such that an entirety of the antenna signal is confined within the outer dimensions of the kiosk structure.

In some embodiments, the method further comprises providing an opening in the kiosk, aligned with the path through the antenna loop, and passing a container through the kiosk opening and also through the antenna loop.

In some embodiments, the method further comprises using a speed controller to limit speed of movement of the container along the path through the antenna loop.

In some embodiments, the host computer receives response signal information from a plurality of such local computers.

In some embodiments, at least first and second ones of the plurality of local computers service at least respective first and second customer entities of a single vendor.

In some embodiments, the plurality of local computers service at least first and second different customer entities for each of at least respective first and second different vendors.

In some embodiments, when the host computer receives a tag response signal input from one of the plurality of local computers, the host computer retrieves, from electronic memory, enough information related to the respective container to determine which of the vendors is to receive the respective tag response signal information, and communicates such tag response signal information to only that respective vendor.

In some embodiments, the method further comprises an order-processing computer receiving at least a portion of the container-related information from the host computer.

In some embodiments, the order-processing computer is controlled by a vendor for the respective consumable product in the at least first and second containers.

In some embodiments, the order-processing computer receives less than all product-related information contained in the container-related information generated by the local computer.

In some embodiments, the order-processing computer processes and effects shipment of a respective product replenishment order, and receives, from the host computer, as identification of the container which was read, only the container identification indicia.

In some embodiments, the method comprises shielding, from the local computer and the host computer, certain details of order replenishment shipments being made by the order-processing computer.

In some embodiments, the local computer retrieves, from electronic memory, enough information about the tag to determine, from the tag response signal information, the identity of the consumable product, so as to facilitate display of product information, corresponding to the read container on a computer display screen proximate the use location.

In some embodiments, the local computer determines, from electronic memory, the quantity of product to be shipped in a replenishment order.

In some embodiments, the computer readable tag comprises an RFID chip using power from the signal transmitted by the antenna to generate the response signal.

In some embodiments, the method further comprises attaching a computer readable bar code on such first and second containers, in addition to the RFID chip.

In some embodiments, the order-processing computer stores, in memory, lot numbers and selected dates for selected shipments of replenishment product, as confirmed by the respective local computers upon receipt of respective shipments of replenishment product.

In some embodiments, the method further comprises identifying a supplier's lot number with a shipment of replenishment product, storing the respective lot number in memory before shipping the replenishment order product to the use location, electronically reading the supplier's lot number at the use location when the product is placed into a respective container at the use location, associating the lot number with the container identification indicia at the use location, and communicating the read lot number in combination with the container identification indicia into which the replenishment product was placed, to the vendor.

In a sixth family of embodiments, the invention comprehends a method of placing replenishment orders for consumable products with one or more vendors for such consumable products, the method comprising providing, at a user facility, a tag reading system for reading a computer-readable tag on an empty container, to be re-filled with replenishment product which tag uniquely identifies that particular container; transmitting a signal which can activate transmission of tag information by the computer readable tag on the empty container; bringing a such refillable, empty container, including a such computer-readable tag, within effective range of the transmitted signal whereby the transmitted signal activates the tag and the tag emits a tag response signal; receiving the tag response signal; communicating container information based on the so-received tag response signal to a local computer, storing information from the so-received response signal in memory controlled by the local computer; periodically communicating the container information, based on any such so-received response signals, from the local computer to a host computer; managing operation of multiple such tag reading systems at multiple remote user locations, using the host computer the host computer communicating the container information to such respective ones of the vendors for the respective such products for fulfillment of such replenishment orders; the respective vendor shipping an order of replenishment product to the user facility; and placing the replenishment order product in the respective refillable, empty container.

In some embodiments, the signal is transmitted by an antenna, the antenna defining an antenna loop, including an opening through the antenna loop, the method further comprising passing an empty such container through the antenna loop and thereby reading the computer-readable tag.

In some embodiments, the method comprises passing a plurality of such refillable empty containers through the antenna loop and reading the computer-readable tags on the respective containers, and providing a receptacle which receives such containers after such containers pass through the antenna loop.

In some embodiments, the method further comprises, upon receipt of a package of replenishment consumable product, electronically reading product identification indicia on the package of replenishment consumable product, and reading and comparing the product identification indicia on respective ones of the empty containers in the receptacle until the product identification indicia on one of the empty containers from the receptacle matches the product identification indicia on the package of replenishment consumable product.

In some embodiments, the method further comprises placing the replenishment consumable product in the container having the matching product identification indicia.

In some embodiments, the method further comprises reading a supplier's lot number on the package of replenishment consumable product, and reporting back to the vendor both the lot number, and the container identification for the empty container into which the replenishment consumable product was placed.

Figure 1:
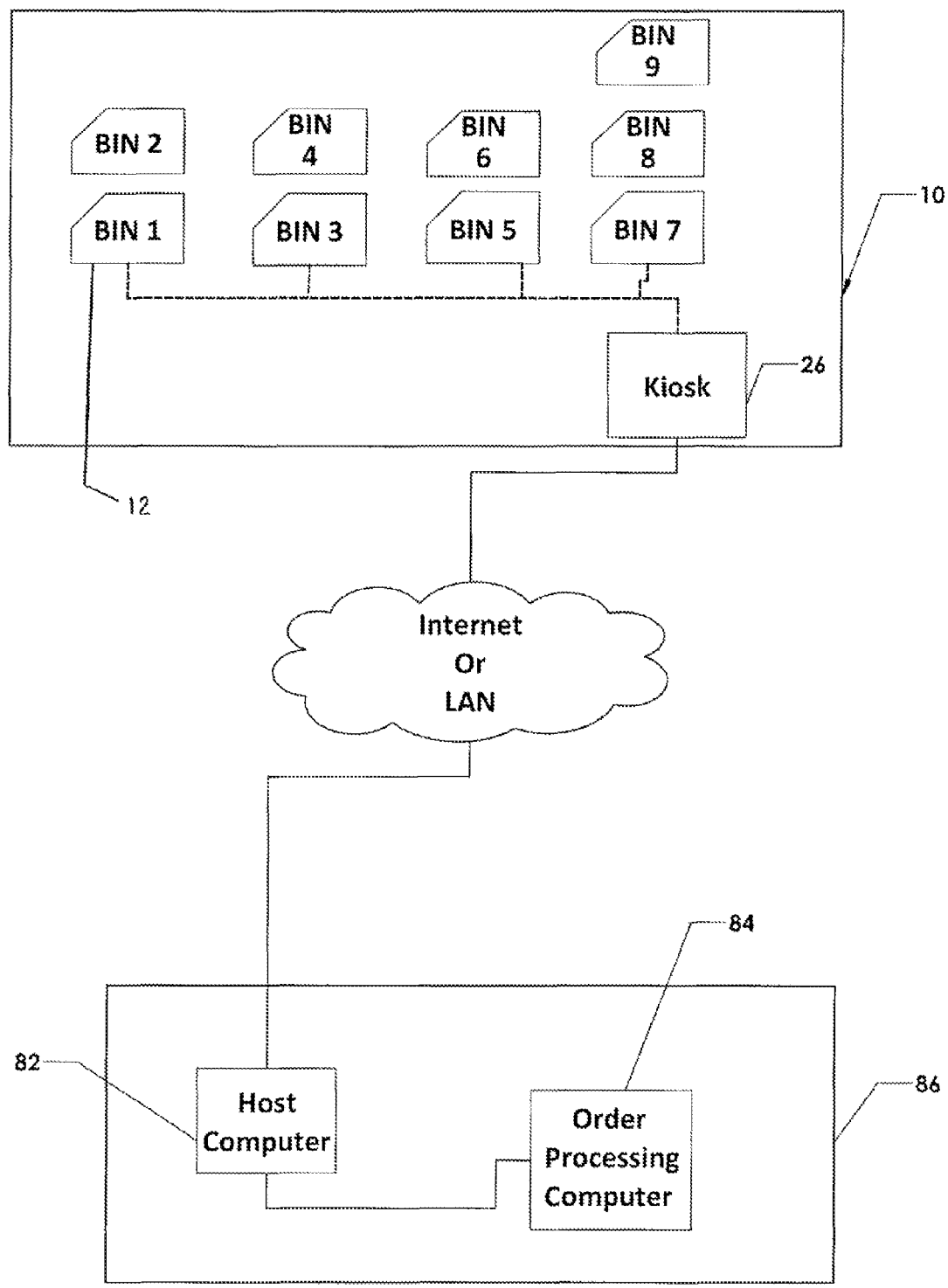
FIG. 1 is a block diagram of the major components of a first embodiment of systems of the invention.

The invention is not limited in its application to the details of construction, or in the arrangement of the components, or in the specific methods set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

FIGS. 1-9 illustrate a first embodiment of a system for managing a consumable parts inventory where a zero inventory level for any particular part is an unacceptable condition. The number 10 in FIG. 1 represents a user location at a user facility where such consumable parts are being used in e.g. an assembly operation. The number 12 represents a plurality of bins which are arranged in a rack 14, illustrated in FIG. 2, the rack being located near an assembly operation.

Rack 14 has a plurality of shelves 16a, 16b, 16c, and 16d, each shelf holding a number of bins. In FIG. 1, bins 1-9 illustrate the bins which are arranged on top shelf 16a in FIG. 2.

Figure 2:
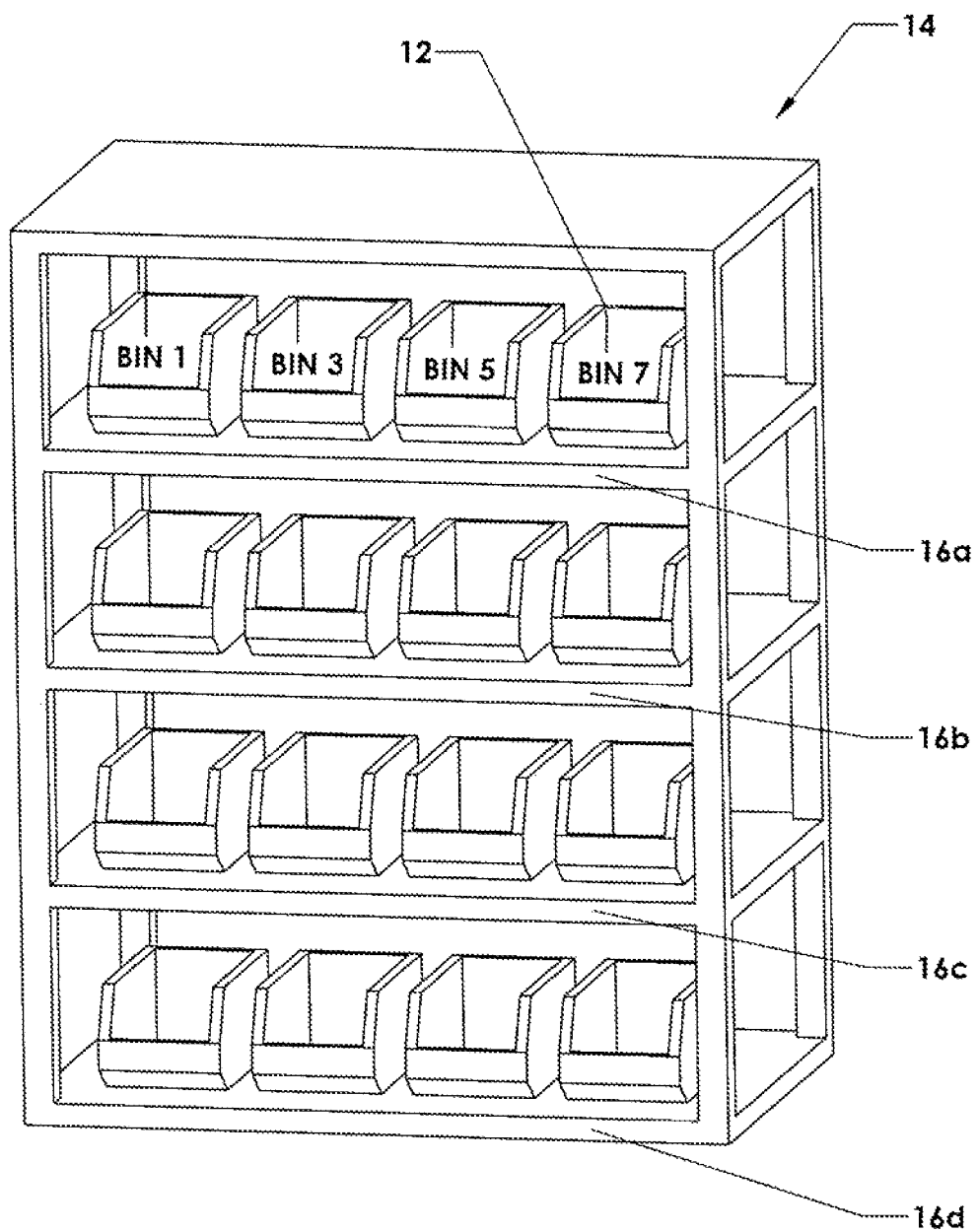
FIG. 2 is a front pictorial view of a rack containing bins, the bins containing consumable parts which are used in an assembly operation.

Referring to FIGS. 1 and 2, bin 2 (not shown in FIG. 2) would be located on the top shelf 16a behind bin 1 and contains the same kind of parts as are in bin 1, whereby the parts in bin 2 can be used interchangeably in the assembly operation with the parts in bin 1. Bin 4 would be located on the top shelf 16a behind bin 3 and contains the same kind of parts as are in bin 3, whereby the parts in bin 4 can be used interchangeably in the assembly operation with the parts in bin 3. Bin 6 would be located on the same top shelf 16a behind bin 5 and contains the same kind of parts as are in bin 5, whereby the parts in bin 6 can be used interchangeably in the assembly operation with the parts in bin 5. Bins 8 and 9 would be located on the top shelf 16a behind bin 7 and contain the same kind of parts as are in bin 7, whereby the parts in bins 8 and 9 can be used interchangeably in the assembly operation with the parts in bin 7.

Figure 3:
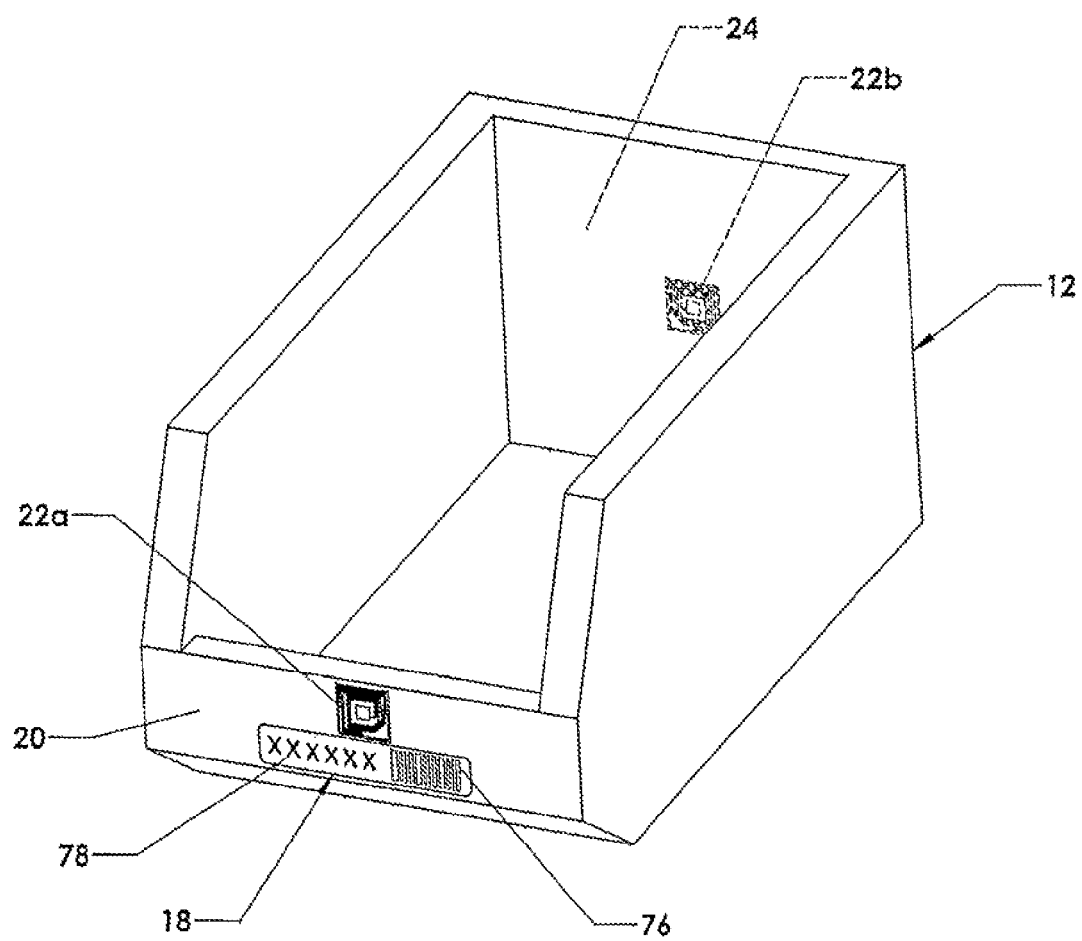
FIG. 3 is a front pictorial view of a bin used in the rack of FIG. 2.

Referring to FIG. 3, a bar code label 18 is mounted on the front wall 20 of an empty bin 12. A first RFID tag 22a is also mounted on the front wall of the bin. A second RFID tag 22b is mounted on the rear wall 24 of the bin.

Figure 4:
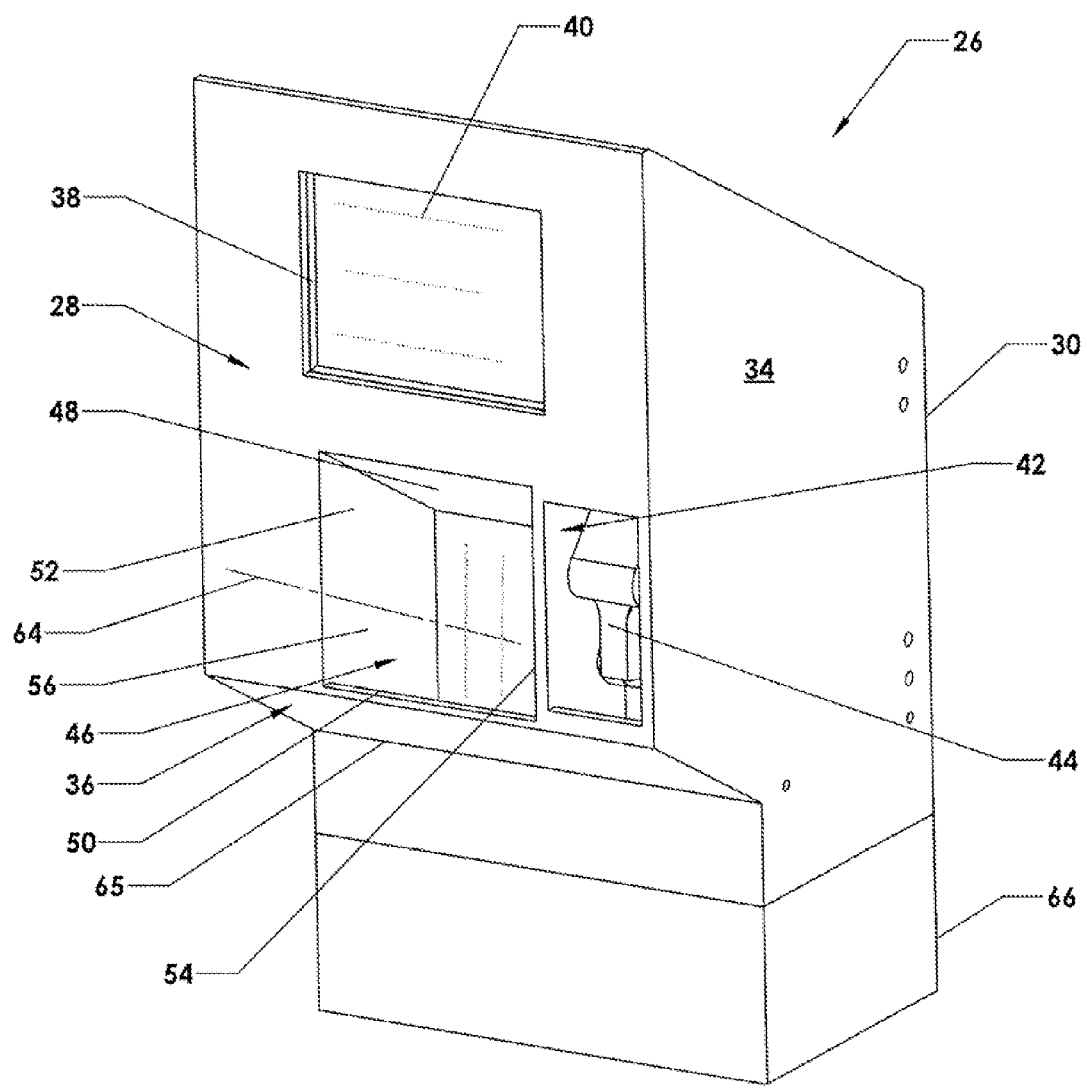
FIG. 4 is a front pictorial view of a kiosk used in the invention.
Figure 5:
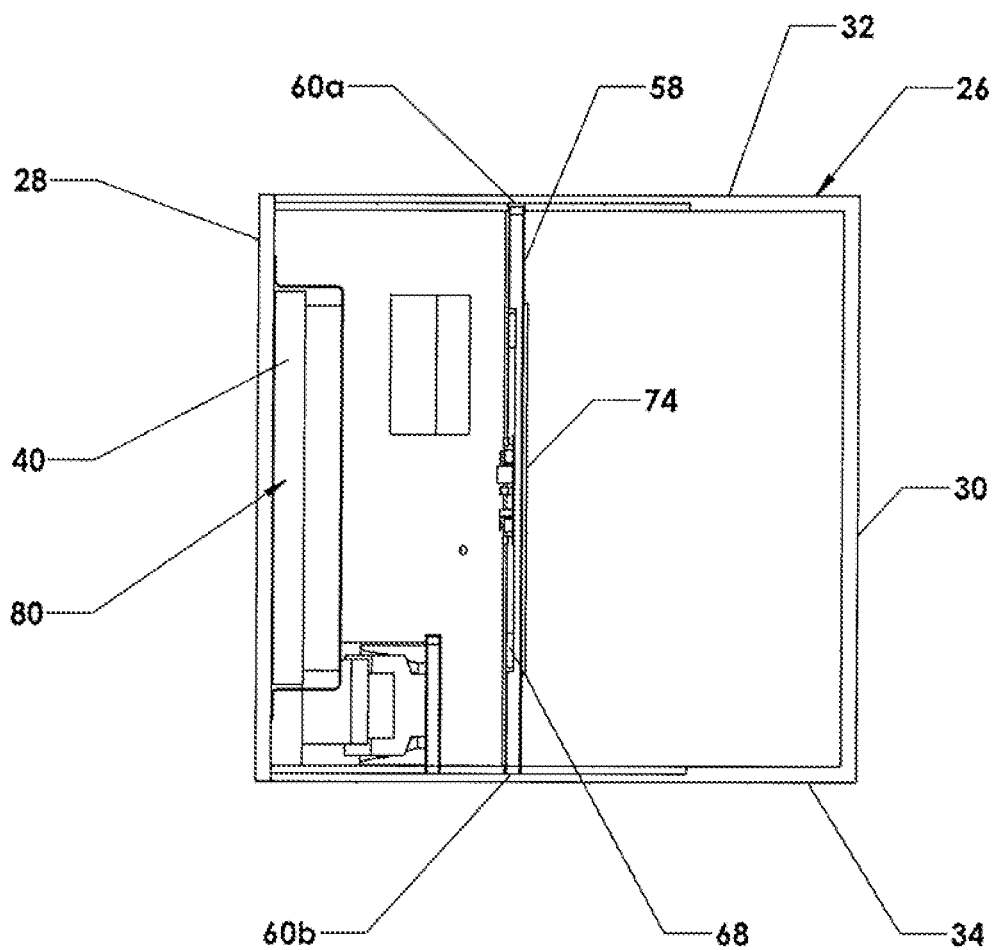
FIG. 5 is a top view of the kiosk of FIG. 4, with the top cut away.

Referring to FIGS. 1, 4 and 5, a kiosk 26 is positioned in the user facility, at the use location, and close to rack 14. Kiosk 26 has a front wall 28, a rear wall 30, a left side wall 32, a right side wall 34, and a bottom wall 36 which extends from the front wall part of the way, but not all of the way, toward the back wall.

An upper opening 38 extends through front wall 28. A computer display 40 is mounted behind upper opening 38 so as to show a computer display through the upper opening.

A lower opening 42 is located below, and to the right, of upper opening 38. Lower opening 42 extends through front wall 28, and has a top wall, a bottom wall, left and right side walls, and a back wall, thus defining a cavity which houses a bar code reader 44. Bar code reader 44 can be either wireless or hard wired.

A centrally-located lower opening 46 extends through front wall 28, and has a top wall 48, a bottom wall 50, a left side wall 52, and a right side wall 54, but no back wall. Bottom wall 50 slopes down from front wall 28 toward back wall 30 for reasons which are described hereinafter. Top wall 48 is also shown as having a similar front-to-back sloping angle. Lower opening 46 thus provides a chute 56 which extends, at a downward slope, and at a generally constant cross-section, through the front wall of the kiosk and toward the back wall; but chute 56 does not reach the back wall of the kiosk.

Figure 6:
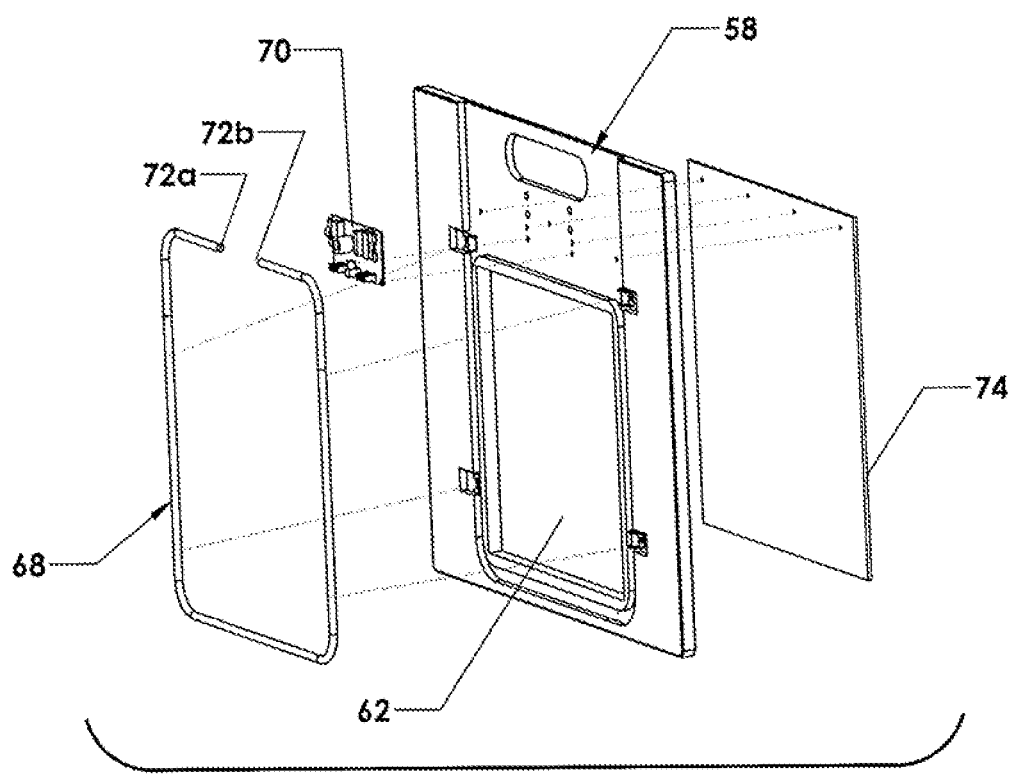
FIG. 6 is an exploded front view of the antenna subassembly and speed controller, which are part of the kiosk illustrated in FIGS. 4 and 5.
Figure 7:
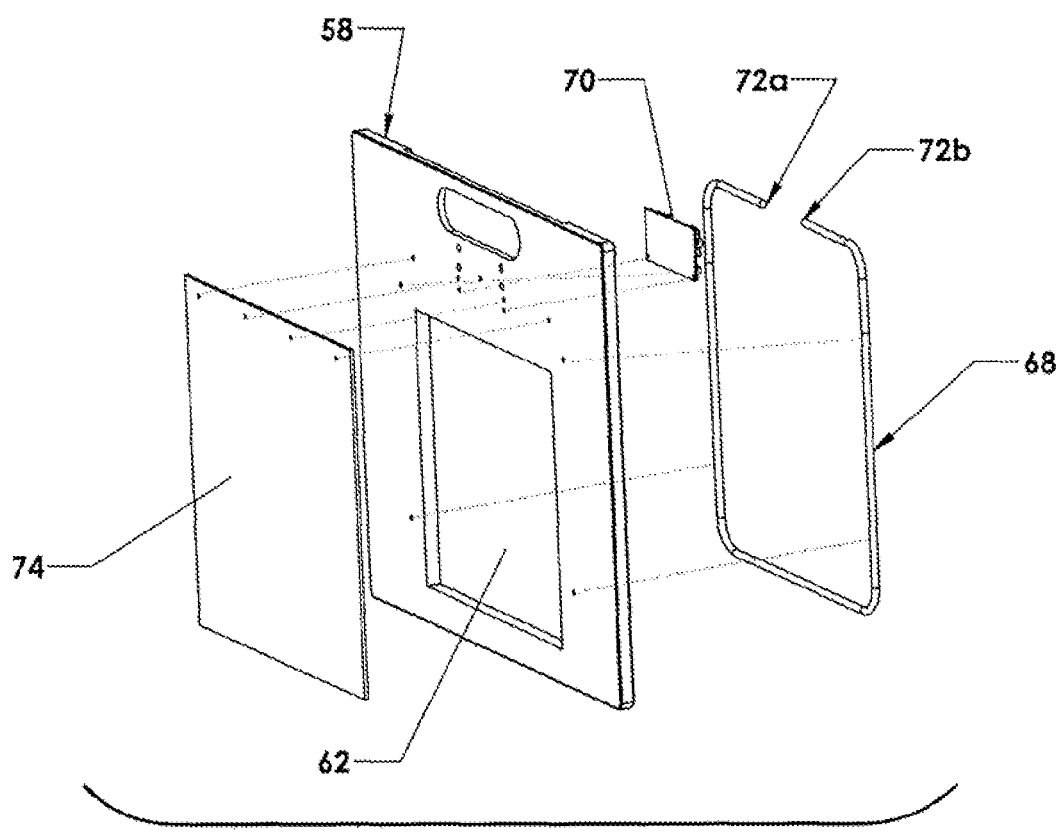
FIG. 7 is an exploded rear view of the antenna subassembly and speed controller shown in FIG. 6.
Figure 8:
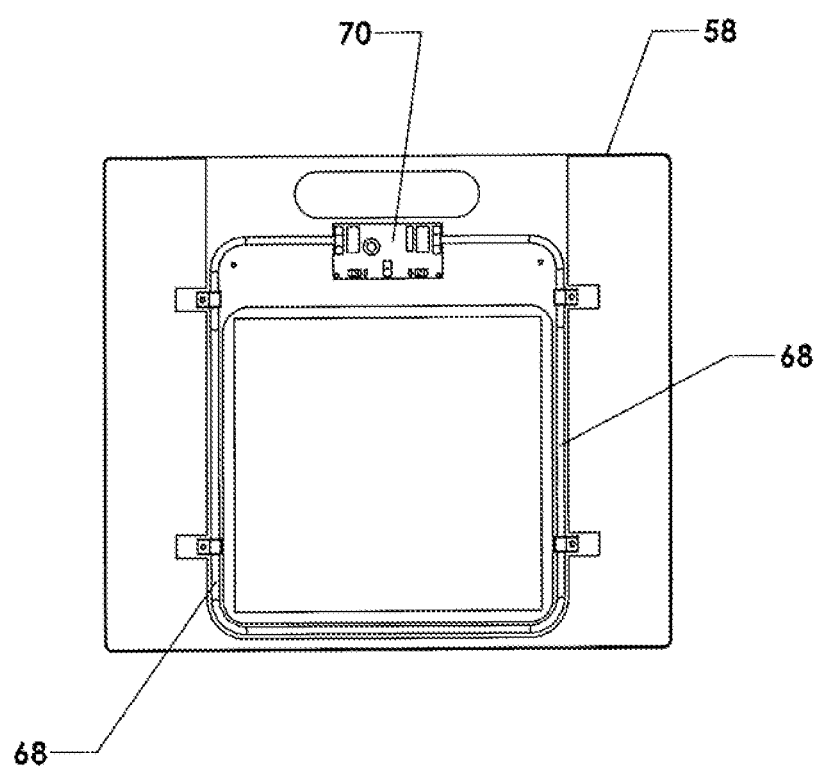
FIG. 8 is a front view of the antenna subassembly and speed controller of FIG. 6, after assembly.
Figure 9:
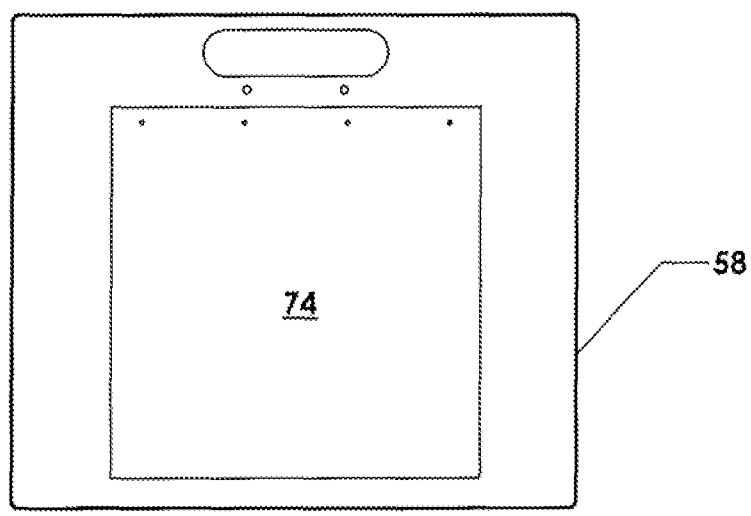
FIG. 9 is a rear view of the antenna subassembly and speed controller of FIG. 7, after assembly.

Referring to FIGS. 5, 6, and 7, an antenna assembly board 58 slides down into upwardly-extending slots 60a, 60b in left and right side walls 32 and 34 of the kiosk structure and thus extends between side walls 32 and 34. An opening 62 extends through antenna assembly board 58 in alignment with the opening defined by chute 56. As illustrated in FIG. 4, chute 56 and opening 62 collectively define a generally constant cross-section path 64 through the chute from the front wall of the kiosk, through opening 62 and past the rear 65 of bottom wall 36 of the kiosk to the interior of the kiosk. Accordingly, an object which is passed along path 64 to the rear of chute 56 drops by gravity out of the kiosk through the opening which exists to the rear of fore-shortened bottom wall 36 and into receptacle 66.

When in use, kiosk 26 is typically at least temporarily mounted on a rack (not shown in the drawings). Receptacle 66 is attached to the bottom of the kiosk and receives any such objects which pass through chute 56. In the alternative, the receptacle can be an integral part of the kiosk, such as at the bottom of the kiosk below bottom wall 36, or in space located to the rear of bottom wall 36, optionally to the rear of what is shown as rear wall 30.

As illustrated in FIGS. 5-9, an antenna subsystem includes a tangible antenna body 68 extending in a loop configuration along a line from a first end 72a to a second end 72b, so as to, by itself, form a closed or partly open curve about opening 62 in antenna assembly board 58, and through which a second tangible object can be passed, the antenna body being closely spaced from the opening and disposed on the front side of the antenna assembly board, namely toward the front of the kiosk and the front of the chute. For example, the antenna body, as mounted on antenna assembly board 58, can be e.g. 0.25 inch from opening 62. Thus, an object which passes through opening 62 along path 64 (FIG. 64) also passes through antenna body loop 68, from the front of the antenna body to the rear of the antenna body.

A circuit board 70, part of the antenna subsystem, is mounted to antenna assembly board 58 adjacent the top of opening 62, and connects to respective ends 72a, 72b of the antenna body. The electronics on circuit board 70 include an antenna tuner, and a signal reader which can read response signals from the bar code reader and the RFID tag.

When the kiosk is fully assembled, the top wall, bottom wall, and side walls of the chute are located between the chute opening and the antenna body loop, thus shielding the antenna body loop and the circuit board from physical contact with any objects which pass through the chute.

A speed controlling flap 74 is located at the back side of antenna assembly board 58 and is shown extending from the top edge of opening 62 to the bottom of the opening. Flap 74 is mounted to antenna assembly board 58, only adjacent the top of the opening, and thus drapes, without further attachment, downwardly over the opening. Speed controlling flap 74 thus serves as an impedance to the passage of any obstacle through opening 62. Typically, the edges of flap 74 overlie edge portions of antenna assembly board 58, whereby the facing surface of the mounting plate interferes with any tendency of edge portions of flap 74 to move, be pushed, through opening 62 and to the front of the antenna assembly board. Flap 74 serves as a speed limiting device, a speed controller, to slow down, and to somewhat control, the advance of an object passing through chute 56. Accordingly, the material for flap 74 can be selected according to how much speed impedance is desired from flap 74.

As is discussed in more detail following, empty bins 12 are tossed into chute 56, whereupon the RFID tags are read by antenna 68. The purpose of speed controlling flap 74 is to control the speed at which the bins or other containers move past the antenna, but not to stop the advance of the bins or other containers through the chute 56 and into receptacle 66, such that the residence time whereby the RFID tags are in electronic communication with the antenna, in the chute, long enough for the antenna subsystem, namely the antenna and the corresponding circuit board, to receive and read the responses from the RFID tags, while not stopping movement of the bins or other containers through opening 62 and past flap 74. Accordingly, depending on the amount of speed control needed from flap 74 for a given antenna system to read the RFID tags, flap 74 may be more or less flexible.

Selection of material for flap 74 is further influenced by the angle of the downward slope of bottom wall 50 of the chute. The purpose of the downward slope of bottom wall 50 is to provide a continuing gravity force urging a bin or other container to continue along path 64 and into underlying receptacle 66. The purpose of flap 74 is to impede speed of such movement of the bin or other container enough that the residence time of the bin or other container in chute 56 is long enough for the antenna to receive and read response information from at least one of tags 22a, 22b. But flap 74 should flex sufficiently easily to not prevent the momentum of a bin or other container, tossed into the chute, from moving past the speed-controlling flap.

As illustrated in e.g. FIGS. 4-8, antenna body 68 is spaced inwardly from the outer walls of the kiosk, including from the top wall, from the bottom wall, from the front wall, from the back wall, from the left side wall, and from the right side wall. The distance between such walls and the antenna body, and the tuning of the frequency and the corresponding effective range of the antenna relative to the RFID tags, is such that movement of a bin, or other object/container bearing an RFID tag close to the kiosk, does not bring the RFID tag close enough to the antenna to trigger a response from the respective RFID tag. Namely, only by movement of the RFID tag into the chute is the RFID tag close enough to the antenna for the tag to be awakened and to emit a response signal. Restated, the outer surfaces of the kiosk are spaced from the signal-emitting antenna body far enough that distance-related decay of the signal emitted by the antenna body is effective to prevent activating computer-readable chips which do not enter the chute.

Thus, the combination of the distance-based spacing of the antenna, inside the outer walls of the kiosk, and the low power setting on the antenna tuner, prevents extraneous reads of RFID tags which may be carried or otherwise moved past or near the kiosk without such RFID tags actually entering the chute.

Bar code label 18 has both an electronically readable bar code 76 and preferably a text description 78 of the parts which are intended to be placed into the respective container. RFID tags 22a and 22b are each distinctive, and are identified to the computer subsystem described in more detail hereinafter.

Computer display 40 (FIG. 4) is in electronic communication with, and may be part of, a local computer 80 which is shown in FIG. 5 as being mounted to the rear surface of front wall 28 of the kiosk.

As illustrated in FIG. 1, local computer 80, as part of kiosk 26, is in electronic communication, such as through a LAN or through the internet, or through the cloud, with a host computer 82.

Host computer 82 is in electronic communication, such as through a LAN or through the internet, with the local computer, typically with a plurality of local computers, and is also in electronic communication with an order-processing computer 84, optionally multiple order-processing computers. Host computer 82 can be located at a vendor's facility, or in the cloud, or at a facility of an independent third party. Typically, the host computer would not be located at a user/customer facility, though such co-location is possible in the broadest embodiments of the invention.

The order-processing computer may be otherwise thought of as a system management computer or an Enterprise Resource Planning computer, all of which are different nomenclature for performance of the function of managing operation of the inventory management system of the invention, including setting up operations for respective customers, controlling access to various of the system information and functions, and receiving, approving, and processing orders. For example, just because an order is received does not mean the order gets shipped until certain information is confirmed by the order-processing computer such as customer identity, product verification, shipping address, customer payments history, and the like.

The inventory management system of the invention operates generally as follows. In order for a customer to begin to use the system, the system must be set up to recognize, and to interact with, that particular customer. In general, in setting up a customer, a vendor 86 sets up the customer account by recording certain basic information in electronic memory available to the order-processing computer 84. The customer account includes such information as company name,
customer identification (ID) number,
ship-to address, and the like.

As part of the customer set-up, the vendor and customer collectively determine how many kiosks are needed at a particular customer facility, and how many racks, and how many bins or other containers, are needed at each use site in the respective customer facility.

Once the basic customer account information has been entered, and the number of kiosks, racks and bins/containers has been established, then the individual kiosks, racks, and bins/containers are identified and recorded in the memory of the order-processing computer. Kiosks are typically identified to a particular use location in the customer facility. Each bin/container is identified to a particular parts use location on a particular shelf in a particular rack. Thus, for a given bin/container, the following steps represent a typical way, but not the only way, to set up a bin/container:

Mount a bar code label on the container.

Mount RFID tags on the outside surfaces of the front and back walls of the bin.

Using an electronic reader, read the bar code label on the container, and record the resulting read information in memory available to the order-processing computer.

Using the same, or a different, electronic reader, read the RFID tags on the front and back walls of the container and record the resulting read information in memory available to the order-processing computer.

Create and record, in electronic memory available to the order-processing computer, the part number information relating to the product to be contained in the respective container, including part number, verbal/textual part description, the container tag associated with that part number, and replenishment order quantity.

Any desired amount of the above information, now in memory available to the order-processing computer, is then communicated to the host computer, with instructions regarding which of the respective communicated information is to be communicated from the host computer to a particularly-identified one of the local computers to which the host computer may be electronically connected.

After the information about the kiosks, racks, and containers has been so set up in the electronic memory available to the order-processing computer, the kiosks, racks, and containers are physically shipped to the respective customer facility and positioned at the designated use locations adjacent where the respective parts are to be used. Depending on the rate at which a respective part number is expected to be used, at least first and second containers are shipped for each such part number. For high-usage rate parts, a third container, or more, may be shipped to the use location.

Sealed packages, e.g. plastic bags, of product to be contained in the respective containers are shipped to the use location in preparation for implementation of the inventory management system of the invention. One package of the replenishment amount of each respective part number is typically shipped for each container which is to contain product to be used at the use location. A fixed replenishment amount of product/parts/pieces is specified to the order-processing computer, relative to each container, at the time the respective containers are identified to the order-processing computer, before shipment to the customer's use location.

Connection between the use location and the order-processing computer is then set up at the use location. The local computer is placed in set-up mode, and is then connected to the host computer by directing the local computer in the kiosk to a particular internet address or LAN address for connection to the respective host computer. Once the connection with the host computer has been established, then the information up-loaded from the order-processing computer to the host computer is downloaded from the host computer to the local computer. The identity of each rack and each container can then be confirmed to the host computer using the bar code reader at the kiosk. Once the racks and containers have been confirmed to the host computer, the containers are placed at their respective shelf locations in the rack, in the order earlier specified by the order-processing computer.

A respective sealed package of product, which has been shipped to the use location, is then read using the bar code reader and the containers in the rack are subsequently read until the local computer makes a match between the bar code on the product package and the respective container—whereupon the package is opened, the product is placed in the respective container, and the container is placed in its designated location on a respective shelf of the rack.

Additional sealed packages of product are read and correspondingly matched to container bar codes and product is placed in the respective containers. For each product, a first container, such as bin/container 1 in FIG. 1, is placed at the front of the rack on a shelf for immediate use as needed by workers working in the assembly operation. The second container, such as container 2, which contains the same product, is placed on the same shelf, behind the front container, such as behind container 1.

With all of the containers thus filled with parts as needed while the local computer is in set-up mode, the local computer is placed in operations mode and the assembly operation proceeds, with workers taking parts from respective containers as needed in the assembly operation.

Placing the local computer in operations mode causes the antenna to be turned on, whereby the antenna is continuously broadcasting, transmitting a signal at a frequency to which the RFID tags are sensitive. If/when an RFID tag receives such signal, the energy from the antenna has an effect on the tag known as "waking up" the tag. The thus awakened tag uses the energy received from the antenna broadcast/transmission to develop and emit its own response signal. Such response signals from the RFID tags are unique to each individual tag. Thus, the response signal from a given RFID tag is unique to that tag, and can be used to identify that tag with whatever materials, resources have been identified with that tag in a computer memory.

But again, the spatial profile of the antenna signal is so controlled within the outer limits of the kiosk structure that no RFID tag is awakened, no RFID tag emits any response signal, responsive to the antenna transmission, unless, until the respective RFID tag enters chute 56, such as an RFID tag on container which is tossed into the chute.

When the local computer receives response signal information from a respective RFID tag, and compares that RFID tag signal to the RFID identification signals stored in memory and received from the order-processing computer, through the host computer, the local computer can then associate the tag so read with a particular container, and thus with a particular part number.

As the assembly operation proceeds, parts are retrieved from the respective containers at the front of the rack. In FIGS. 1 and 2, that would be container 1, container 3, container 5, and container 7. When, for example, all of the parts have been taken from container 1 and used in the assembly operation and container 1 is empty, a worker removes container 1 from rack 14, and moves container 2 forwardly to the front of shelf 16a and begins using parts from container 2 where he/she would have previously used parts from container 1 if container 1 were in the same location and not empty.

Removing container 1 from shelf 16*a*, and beginning to use parts from container 2, both serve to advise the respective worker at the use location that replenishment parts need to be ordered for container 1. The vendor, of course, does not yet know that replenishment parts need to be ordered and/or shipped.

In the invention, when the worker removes the empty container 1 from the rack, he/she tosses the empty container, namely throws the empty container with a quick, light, or careless motion, into chute 56, thus into kiosk 26, whereby the container enters the chute in a random orientation of the container relative to the chute, and can pass through the chute opening at any orientation of the container to the chute opening. The combination of the mass of the container and the velocity of a typical tossing of the container into the chute determines the momentum with which the container enters the chute. The downward slope of bottom wall 50 of the chute adds an ongoing gravity-based increment to that momentum of the container passing into and through the chute. By contrast, flap 74 serves to control, limit the speed at which the container passes through the chute, while not stopping the container from passing through the chute.

As the empty container passes through chute 56, antenna 68, now in the operations mode, is continuously transmitting a signal which can wake up the tags on the container. Assuming the container is not moving so fast as to cause a failed read, the energy of the signal being transmitted by the antenna wakes up one or both of the tags, and the respective tag or tags emit response signals providing its/their unique identity/identities. The response signal is received by antenna 68, or some other receiving antenna, and is passed to the signal reader in circuit board 70. The signal reader reads the response signal emitted by the tag and passes the signal read information to local computer 80.

Local computer 80 acknowledges receiving a tag read signal and emits a corresponding sound, or lights a light on the front of the kiosk, or both, or otherwise advises the worker that a tag has been read. Local computer 80 then matches the tag signal information as read in the kiosk with matching tag signal information in memory to which the local computer has access, and thereby determines which container has been tossed into the chute, correspondingly determines the product identity, and shows the product identity, for example as a text string, on the display screen. The worker can read the product identity on the display screen and thereby confirm that the product identity so read corresponds with the product identity printed on the bar code of the container which has just been tossed into chute 56.

If container 12 passes through the chute too fast, the antenna transmitted signal may not activate the RFID tag, or the tag, even if activated, may by then be too far from the antenna for the antenna to receive the response signal from the tag. So the combination of the mass of the container, the downward slope of the bottom wall of the chute, and the physical properties of flap 74 collectively determine whether the container proceeds past flap 74 and, if so, whether the speed of movement of the container is compatible with the antenna receiving a response signal from at least one of the tags 22*a* or 22*b*.

The critical maximum speed of the bin passing through the chute, in order for the tag to have enough time to activate and respond to the antenna signal, and for the antenna to receive the tag response signal, is dependent on the speed of the electronics in the antenna assembly and in the tag. Accordingly a user, when designing and setting up a system, will determine the reaction time of the respective electronics to be used and will, accordingly, specify the container-interference parameters required of flap 74.

When response information is received from the tag, and is communicated to the local computer, the local computer at least temporarily stores the response signal information in electronic memory. To the extent the local computer is then currently connected to the host computer by a LAN connection, or by an internet connection, the local computer transmits selected portions, namely less than all, or optionally all, of the response signal information to the host computer. If the local computer is not then currently connected to the host computer, the local computer attempts to connect to the internet at periodic intervals such as once per minute and thereby to connect to the host computer. In any event, the local computer stores the response information in memory at least until the selected such information is successfully communicated to the host computer. To the extent additional containers are tossed into chute 56 before a given tag response information is successfully communicated to the host computer, then when the local computer successfully communicates with the host computer, all such container information, including from the additional container or containers, is transmitted to the host computer.

Assuming the host computer is connected with multiple local computers at multiple use sites, including optionally with multiple customers, the host computer collects, receives such container reporting information from the respective local computers. While the amount of information communicated from the host computer to the order-processing computer can vary, the only information typically needed by the order-processing computer in order to initiate an order is for the order-processing computer to receive the identity of the container which was tossed into the chute. For example, if the container has a unique container number, that unique container number is all the information needed by the order-processing computer to initiate an order. Restated, given the container number or other information uniquely identifying the container, the order-processing computer can retrieve from electronic memory, based on the customer set-up, the kiosk set-up, the rack set-up and the container set-up, everything else needed in order to initiate, process, and ship an order of replenishment product to the respective use site or sites, with the quantity of product shipped having been predetermined when the container information was first entered at the order-processing computer as the container was being set up for shipment to the customer facility.

Correspondingly, the order-processing computer is also used to add new containers to a given use location, to delete containers from a given use location, and to change any of the information associated with a given container, such as container location, parts to be stored in that container, quantity of parts to be included in replenishment orders, and the like, and to convey such information to the host computer, and/or to the local computer via the host computer, as desired.

The order-processing computer is also likewise used to enter, store, and change information relating to customer identity, customer location, and the like, as well as any financial considerations which relate to that particular customer.

FIG. 1 has been used to illustrate the connectivity between a vendor 86 for such parts as are of interest in the invention, and a single customer at a single use location 10. A typical vendor is, of course, interested in servicing a plurality of customers at a plurality of user locations 10. And the systems and methods of the invention are compatible with such uses. In implementing use of the invention with a plurality of customers at a plurality of use locations, a local computer 80 at each use location is set up to communicate with host computer 82, such that the host computer communicates with the plurality of local computers at the respective plurality of use locations.

In order to protect the confidentiality of information specific to each of the user locations, host computer can recognize, and discriminate, the identity of each container at each location. Any time a tag response from a tag passing through a chute, or other information, is received from one of the local computers, the host computer communicates corresponding information to order-processing computer 84. So host computer 82 serves as a conduit for all message traffic passing between each of the plurality of local computers and the vendor's order-processing computer. Namely, host computer 82 is receiving messages, communications from a plurality of local computers and is conveying corresponding messaging to the order-processing computer 84.

Messages from the order-processing computer are communicated to the host computer. The message information sent from the order-processing computer to the host computer includes enough information that the host computer can determine which use location is to receive the respective communication.

For example, the message from the order-processing computer can include the specific customer and use location.

As another example, the message from the order-processing computer might include only a part number which is unique to a specific customer and use location, and the host computer would retrieve from electronic memory the use location and customer identity, thus to direct the message to the correct local computer.

As yet another example, the message from the order-processing computer might include only container identity, such as container number; and the host computer would retrieve from memory enough information to direct the message to the correct local computer.

The specific information communicated to the host computer can thus be any information which the host computer can use, in combination with information retrievable from electronic memory, to identify the local computer to which the message is to be directed.

Whatever combination of information received from the order-processing computer and retrievable from electronic memory by the host computer, the host computer directs a given message from the order-processing computer to only that one local computer which the order-processing computer, in some manner, associates with that particular message.

It is possible, of course, though not typical, for the order-processing computer to address a given message to more than one local computer. It is important, of course, that messages not be sent to local computers which have no need to act on a given message. First, messages for which there is no need to act consume message traffic capacity without accomplishing anything associated with managing the parts inventory, availability. Second, such messages could inadvertently, and inappropriately compromise otherwise confidential and/or trade secret information.

Figure 10:
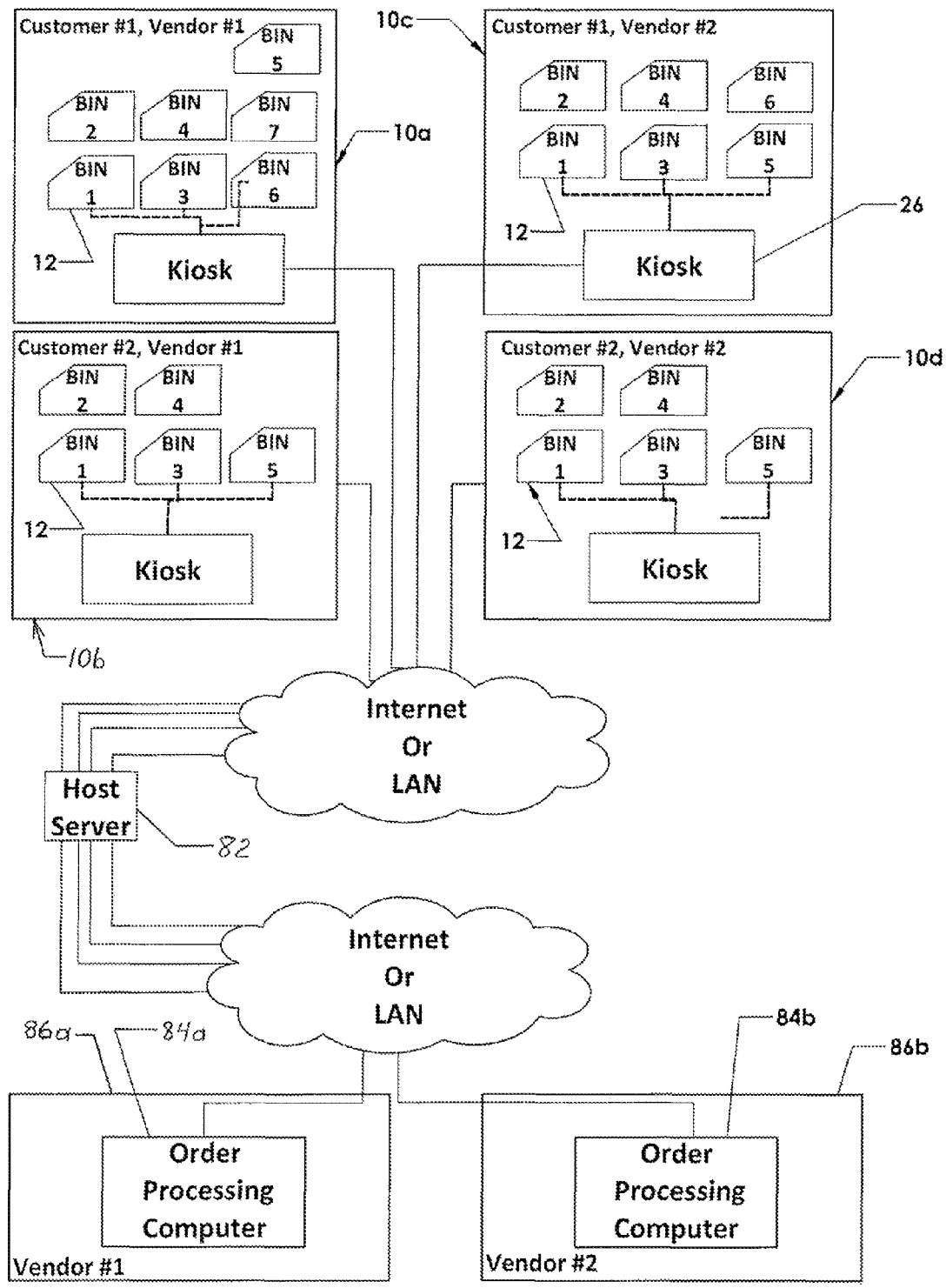
FIG. 10 is a block diagram showing major components of a second embodiment of systems of the invention.

FIG. 10 illustrates multiple use locations 10a, 10b, 10c, and 10d as discussed above. However, FIG. 10 also shows host computer 82 communicating with first and second vendors 86a, 86b, e.g. a plurality of vendors, each having its own order-processing computer e.g. 84a or 84b. While host computer 82 can be co-located with a particular one of the vendors, and can be controlled by one of the vendors, FIG. 10 shows the embodiment where the host computer is physically separated from all of the vendors and is operated and controlled by an independent third party.

Still referring to FIG. 10, the same set-up is used in establishing a customer use of the system of the invention. Namely, information relating to customer identity, customer location, kiosks, racks, containers, part numbers, and the like is recorded at the order-taking computer of the respective vendor and is communicated to the host computer. The respective physical elements are shipped to the use location. At the use location, the kiosks, racks, containers, part numbers, and the like are identified to the local kiosk-based computer, and the local computer communicates the necessary information to the host computer to complete the identification of the local computer, through the host computer, to the order-processing computer.

Similarly, the order-taking process, where the empty containers are tossed into the chute, is all the same as in the embodiment illustrated in FIG. 1. The difference is that, in the FIG. 10 embodiment, the host computer is tasked with distinguishing not only between use locations, but is also tasked with associating each message with the correct vendor.

In the embodiment of FIG. 10, a given use location, customer location may be receiving orders through the system of the invention from only one vendor. As an alternative, a given use location, customer location may be receiving orders through the system from multiple vendors. Thus, the user at use location 10c can be receiving orders for different parts, or for the same parts, from multiple vendors.

Where the parts are different from the respective different vendors, host computer 82 is responsible for determining, as to each order, which vendor is servicing orders from that use location, customer for that particular part/SKU. Where the user can receive the same parts from multiple approved vendors, the host computer may be tasked with determining which vendor receives a given order for a particular part based on e.g. customer-established criteria, such as current price, current availability for shipment, quality concerns, or the like. Thus, the host computer can serve a valuable role for the customer, in ensuring timely availability of parts at a competitive price, while offering a given vendor an opportunity to sell more parts to more customers by meeting certain parameters as specified, and optionally, as prioritized and weighted, by the customer.

Thus, the host computer can be thought of as directing the order traffic to and from the respective local computers as well as to and from an order-processing computer of a single vendor, or to and from order-processing computers of multiple vendors.

As suggested above, it is possible that certain products in the product inventory are used only occasionally, namely in relatively smaller quantity such that dedicating two containers worth of inventory or space may not be justified for that part number. In such situation, parts for that particular part number are stored/contained in a single container; and a replenishment order needs to be entered for such parts before that one container is completely empty. In the event a single container is used for a given part number, conventional single-bin methods can be used to monitor for, and detect, when replenishment parts should be ordered for that container.

When such replenishment threshold is reached, an assembly worker, or a vendor representative, uses bar code reader 44 to read the bar code on the respective container. Such read information is communicated from the bar code reader to the local computer whereupon the local computer treats such container input information the same as an RFID response signal, resulting in communicating such information to the host computer, ultimately to the respective order-processing computer, and shipment of replenishment product to the respective use facility.

When the replenishment shipment is received, the bar code on the replenishment package is read using the bar code reader, and that read is matched to the respective container, just the same as for parts which use the two-bin system. The respective read, including lot number as applies, is communicated back to the host computer, thence back to the respective order-processing computer.

Figure 3A:
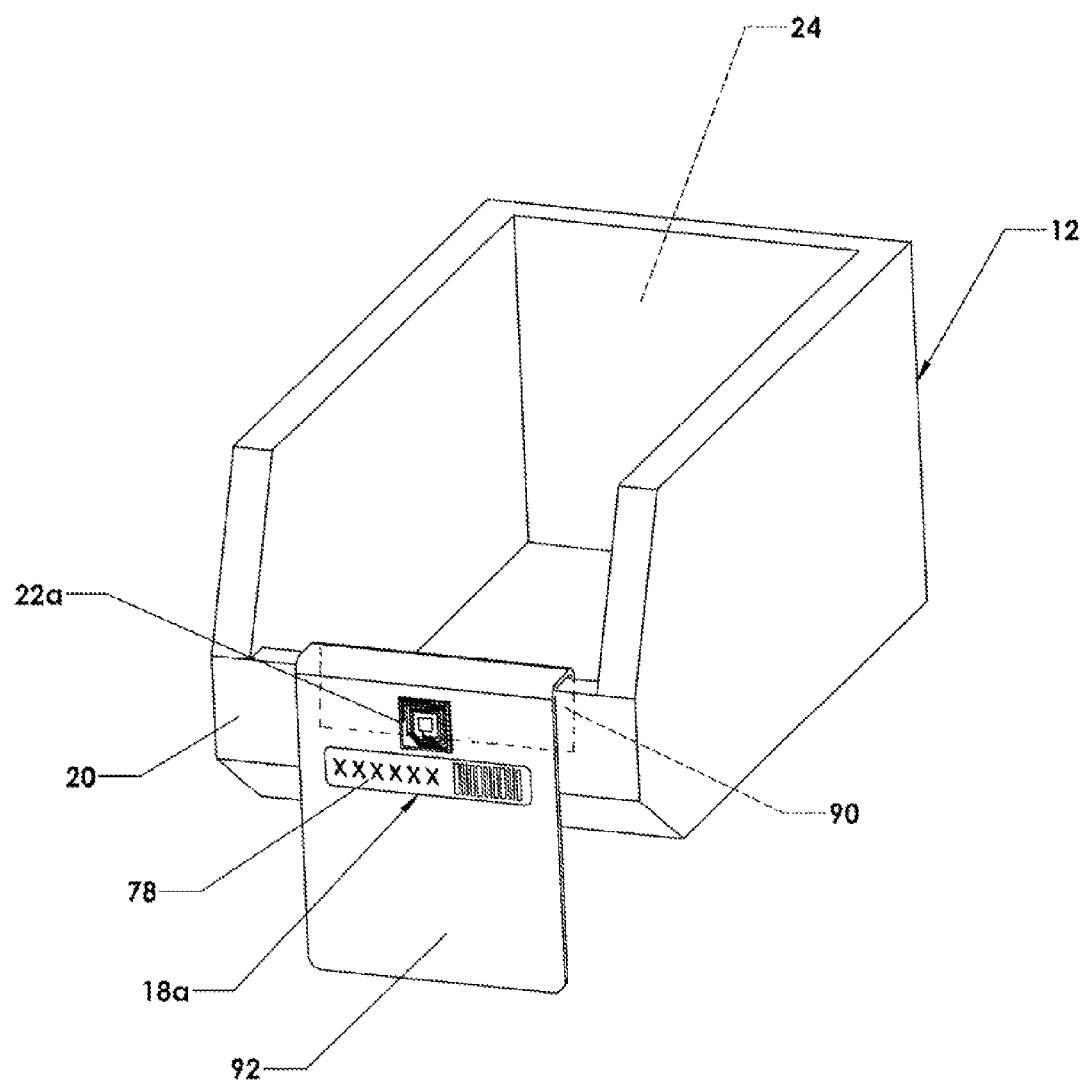
FIG. 3a is a front pictorial view of a bin as in FIG. 3, including a removable clip mounted on the front wall of the container.

In some instances, the appropriate size of the container, to hold the required number of parts, products, may be greater than the size of the chute opening, such that the container cannot be tossed through the chute. In such instance a clip 88 may be mounted on the front wall of the container as illustrated in FIG. 3*a*, or on either of the side walls or the back wall. Such clip, as illustrated in FIG. 3*a*, has an inner panel 90 which extends down from the top of the front wall of the container on the inner surface of the front wall. The clip also has an outer panel 92 which extends down from the top of the front wall of the container on the outer surface of the front wall. A clip bight, located at the top of the front wall of the container extends between inner panel 90 and outer panel 92, and connects the inner and outer panels to each other. The inner and outer panels are resiliently biased toward each other through the bight such that the inner and outer panels resiliently grip the front wall, thus removably mounting the clip to the front wall. If the clip is mounted on one of the side walls or the back wall, the clip, of course, grips the respective side wall or back wall.

Figure 3B:
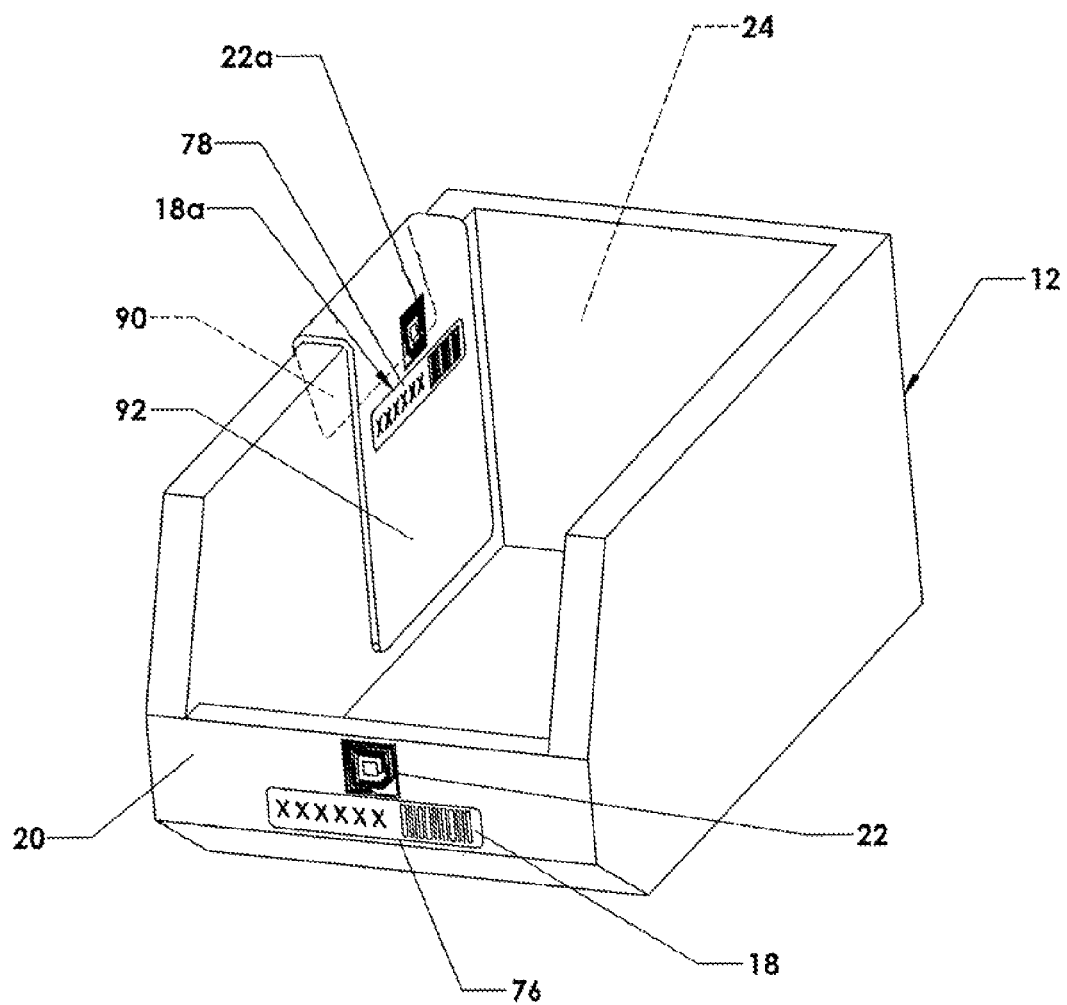
FIG. 3b is a front pictorial view of a bin as in FIGS. 3 and 3a, including a removable clip mounted to the left side wall of the container.

A bar code label 18 is mounted on the front wall of the container as in FIG. 3, or elsewhere as desired. A respective, and corresponding, bar code label 18*a*, is mounted on one of the outer and inner panels of the clip, typically on the front surface of the outer panel of the clip. FIG. 3*b* shows the clip mounted on the left side wall of the container, with the bar code and RFID tag facing inwardly into the containment space defined by the container receptacle. A first RFID tag 22*a* is mounted on a surface of one of the panels of the clip, facing away from the wall to which the clip is mounted, e.g. away from the front wall in FIG. 3*a* and away from the side wall in FIG. 3*b*. A second RFID tag is mounted on an opposing surface, facing in a direction directly opposite to the direction faced by the first RFID tag.

When the container is empty, the user removes the clip from the container, by sliding the clip upwardly until the lower surface of the inner panel is at the top of the front wall of the container, thus releasing the clip from the container, and tosses or otherwise moves the clip, instead of the container, through the chute, thus recording, to the local computer, the need for a product replenishment order.

As an alternative, the user can use bar code reader 44 to read the bar code on label 18 or label 18*a* to thus identify, to the local computer, the need for product replenishment.

When the product replenishment order arrives, the user reads the bar code on the replenishment product, and matches the product replenishment bar code to the bar code label on the clip as well as to the bar code label on the container. When that 3-way match is confirmed, the user places the replenishment product in the container, re-mounts the clip to the front wall of the container, and places the container back on a desired shelf in the rack.

Although the invention has been described with respect to various embodiments, it should be realized that this invention is also capable of a wide variety of further and other embodiments within the spirit and scope of the appended claims.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A system for managing a consumable products inventory at one or more use locations for such products where such products are temporarily stored in a container and wherein each such product is consumed by a single use of such product, said system comprising:
   (a) a container, having a computer readable RFID tag mounted thereon, said container being adapted and configured to temporarily store a first supply of such products, wherein such products are consumed when removed from said container, and wherein said container is replenished from a package containing a second supply of such products, all while the computer readable RFID tag remains mounted on said container;
   (b) an antenna assembly, said antenna assembly comprising a tuner, a signal reader, and a signal-emitting antenna body, said antenna body receiving electrical signals from said tuner, an antenna opening extending through the antenna body, the opening having a cross-section adapted to receive said container therethrough while said computer readable tag is mounted on said container;
   said signal reader being capable of reading tag response signals received from said computer readable RFID tag; and
   (c) a computer subsystem, the computer subsystem receiving tag response signals from said signal reader, and using information from such tag response signals to manage the respective consumable products inventory.

2. A system as in claim 1, said antenna body extending along a line so as to, by itself, form a closed, or partly open, curve through which said container can be tossed, said antenna body thereby defining an antenna body loop, further comprising a kiosk extending about, and outwardly from, the antenna body loop far enough that an entirety of the effective range of the antenna signal transmitted to activate such RFID tag, as broadcast by the antenna body, is limited to physical dimensions of said kiosk.

3. A system as in claim 2, further comprising a chute, defining a chute opening, extending through the antenna body loop and into said kiosk, thereby defining a path through said antenna body loop, said container bearing a computer-readable RFID tag, said container and the chute opening being cooperatively adapted and configured such that said container can be tossed through said chute and thereby pass through the chute opening at any orientation of the container to the chute opening.

4. A system as in claim 2 wherein said kiosk extends frontwardly of the antenna body loop to a front end of said kiosk, and rearwardly of the antenna body loop to a rear end of said kiosk, and to the left and right sides of said antenna body loop, and above and below said antenna body, far enough that an entirety of the effective range of the transmitted antenna signal to activate such RFID tag, as further defined by distance-related signal decay, is limited to a three-dimensional physical space between the front end and the rear end, and the left side and the right side, and a top and a bottom, of said kiosk.

5. A system as in claim 2, said kiosk comprising an antenna assembly board extending across said kiosk, between left and right sides of said kiosk, and downwardly below the top of said kiosk, and a board opening extending through the antenna assembly board, said antenna body loop being mounted in said kiosk proximate said antenna assembly hoard, and outwardly of, and proximate, said board opening, a speed control flap mounted to said antenna assembly board only adjacent a top of the board opening, and draping, without further control, downwardly over the board opening, said speed control flap being designed and configured to control speed of movement of said container when said container is tossed through said chute, while not barring such movement of said container, such that said container can be tossed through the board opening with substantially simultaneous activation of the RFID tag on the respective container and respective emission of tag response signal information, including said signal reader reading the tag response signal information while the container, having been tossed into said chute, is passing through said chute.

6. A system as in claim 1, further comprising a local computer in communication with said signal reader, said signal reader communicating the tag response signal information, read from such RFID tag on said container, to said local computer.

7. A system as in claim 6, further comprising a host computer in communication with said local computer, said local computer communicating less than all of the tag response signal information to said host computer.

8. A system as in claim 7, further comprising a vendor order-processing computer in communication with said host computer, said host computer communicating at least a portion, optionally less than all, of the tag response signal information to said vendor order-processing computer, said vendor order processing computer processing an order based on such tag response signal information and effecting shipment of a package of re-supply product to the respective customer use location.

9. A system as in claim 1, further comprising a kiosk extending about, and outwardly from said signal-emitting antenna body far enough that distance-related signal decay of the emitted signal is effective to prevent activating computer-readable chips which do not enter the kiosk.

10. A system as in claim 1 wherein said computer subsystem uses the information from the tag response signals to confirm customer identity, product verification, and shipping address, and subsequently effects shipment of a such package containing an appropriate replenishment order to the respective customer.

11. A system for capturing and processing information from computer-readable tags, said system comprising:
(a) a plurality of containers adapted and configured to temporarily store sequential first and second supplies of consumable products, wherein such products are consumed when removed from said containers, and wherein said containers are replenished from packages containing subsequent supplies of such products, each said container having first and second such computer readable tags mounted thereon and spaced from each other, both of said first and second computer readable tags being responsive to a same broadcast signal frequency, a given said container having a length, a width, and a height,
(b) a kiosk, comprising
(i) a kiosk body having a front and a rear,
(ii) a reservoir for holding such containers being associated with said kiosk body,
(iii) a chute having a chute opening extending into said kiosk body and communicating with said reservoir, the chute opening being surrounded by chute walls, and
(iv) an antenna assembly, comprising a circuit board, and a signal-emitting tangible antenna body, said circuit board comprising a tuner and a signal reader, said tangible antenna body defining an antenna body loop extending about said chute proximate said chute walls, and an antenna body opening extending through said antenna body loop, thereby defining a front-to-rear path through the antenna body loop,
said chute, said antenna body opening, and said containers being sized and configured, and said antenna body emitting a sufficient signal, that at least some of said containers, having the first and second computer readable tags mounted thereon, can be tossed into the chute, and thence conveyed to said reservoir in said kiosk body, and wherein said tossed containers have random orientations relative to said chute as said containers pass through said chute, and wherein said antenna signal activates at least one of said first and second computer readable tags on the respective said containers as the respective containers pass through said chute, and before the respective containers reach said reservoir; and
(c) said signal reader being adapted and configured to read a response signal received from either of the first and second computer readable tags.

12. A system as in claim 11, said kiosk further comprising a left side, a right side, a top, and a bottom, all collectively defining a three-dimensional physical space encompassed by respective physical dimensions of said kiosk, said kiosk extending about, and transversely outwardly from, the antenna body loop, including extending transverse to the path through the antenna body loop far enough, and a power setting on said circuit board being low enough, that an entirety of the effective range of the antenna signal transmitted to activate said computer readable tags, as broadcast by said antenna body, and as defined by distance-related signal decay is limited to a three-dimensional physical space encompassed by said kiosk.

13. A system as in claim 12 wherein said kiosk extends frontwardly of a front of the antenna body loop and rearwardly of a rear of the antenna body loop, and transversely of the path, far enough that an entirety of the effective range, both front-to-rear range and transverse range, of the antenna signal, as defined by distance-related decay, is limited to the physical space encompassed by said kiosk.

14. A system as in claim 11, said kiosk comprising an antenna assembly board extending across said kiosk, between left and right sides of said kiosk, and downwardly below the top of said kiosk, and a board opening extending through the antenna circuit board, said antenna body loop being mounted in said kiosk proximate said antenna assembly board, and outwardly, and proximate, said board opening, a speed control flap mounted to said antenna assembly board only adjacent a top of the board opening, and draping, without further attachment, downwardly over the board opening, said speed control flap being designed and configured to control speed of movement of any respective said container tossed through said chute, while not barring such movement of such container, such that a said container can be tossed through the board opening with substantially simultaneous activation of at least one of the first and second computer readable tags on the respective container and respective emission of the response signal information, including said signal reader reading the tag response signal information while the container, having been tossed into said chute, is passing through said chute.

15. A system as in claim 11, further comprising a local computer in communication with said signal reader, said signal reader communicating the tag response signal information, read from a such computer readable tag on said container, to said local computer.

16. A system as in claim 15, further comprising a host computer in communication with said local computer, said local computer communicating at least a portion, optionally less than all, of the tag response signal information, to said host computer.

17. A system as in claim 16, further comprising a plurality of competing vendor order-processing computers in communication with said host computer, said host computer being adapted and configured to select an appropriate said vendor order-processing computer to receive and respond to the tag response signal information, based on pre-determined vendor selection criteria, and to communicate at least a portion, optionally less than all, of the tag response signal information, so received from said local computer, to the selected said vendor order-processing computer.

18. A system as in claim 11 wherein said computer readable tags are RFID tags, further comprising a-computer readable bar codes on said plurality of containers, in addition to said computer readable tags.

19. A system as in claim 11 wherein both of said computer readable tags remain mounted on said container through consumption of multiple replenishments of such consumable product from said container.

20. A system wherein a customer places replenishment orders for commonly-stocked consumable products with a vendor for such consumable products, containers being provided for respective ones of such commonly-stocked consumable products, said system comprising:
(a) at a use location at a customer facility, a container adapted and configured to temporarily store consumable products, wherein such consumable products are consumed when removed from said container, said container having mounted thereon a computer readable tag, each such said computer readable tag, and thus said container, as well as a particular one of the consumable such products to be used at that use location, having been identified to electronic memory;
(b) a kiosk having a chute defining a chute opening which provides a generally constant cross-section path extending, from a front of said kiosk, into an interior chamber inside said kiosk, said kiosk receiving said container, with said computer readable tag mounted thereon, tossed through said chute along the generally constant cross-section path, and into said interior chamber; and
(c) an antenna subsystem, in said kiosk, transmitting electronic signals at a frequency which can awaken such computer readable tag while said tossed container, bearing said computer readable tag, is passing through said chute
in response to which antenna signals, such computer readable tag emits a tag response signal,
said antenna subsystem further being adapted and configured
to receive such response signal from said computer-readable tag,
to read such response signal, and
to generate computer-readable signal information pertaining to such tag response signal; and
(d) a computer subsystem adapted and configured to receive such tag response signal and to initiate an order for the respective product.

21. A system as in claim 20, said computer subsystem comprising at least one said local computer, and a host computer connected, at least intermittently, to said at least one local computer, said host computer receiving less than all of such tag response signal information from said at least one local computer.

22. A system as in claim 20, the antenna signal being so tuned, and said kiosk having outer dimensions extending about, and outwardly from, the antenna body, far enough that an entirety of the effective range of the antenna signal, as transmitted by said antenna, and as defined by distance-related signal decay, is limited to a three dimensional physical space defined inside said kiosk.

23. A system as in claim 22, said antenna body including an antenna body loop, and an antenna body loop opening extending through said antenna body loop, thereby defining a path through the antenna body loop, the antenna body loop opening being sized and configured, outwardly of said chute, to enable a user to toss said container through the antenna body loop opening as said container is being tossed through said chute.

24. A system as in claim 20, said local computer having stored in electronic memory enough information relating said computer readable tag to a respective product to determine, from reading the tan, the number of units of product to be shipped in a replenishment order.

25. A system as in claim 23, further comprising a chute, defining a chute opening, extending through the antenna body loop opening and into said kiosk, whereby said container, bearing said computer-readable tag can be received into said kiosk through the chute opening at any orientation of said container relative to the chute opening.

26. A system as in claim 21, said at least one local computer comprising a plurality of local computers, which service at least respective first and second different customer entities of a vendor.

27. A system as in claim 26, comprising first and second local computers which service at least first and second different customer entities, through said host computer, for at least respective first and second different vendors.

28. A system as in claim 27, said host computer receiving competing replenishment supply offers from competing first and second different vendor computers, and wherein said host computer, upon receipt of the tag response signal information retrieves, from electronic memory, enough information related to the tag response signal information to identify the product to be ordered, and selects a vendor to fill the respective order based on pre-selected criteria and existing competing replenishment supply offers, and communicates such tag response signal information to the selected vendor order-processing computer corresponding to only that respective vendor, whereupon the respective vendor order-processing computer effects processing and shipping of a respective said replenishment order.

29. A system as in claim 28, packaging containing the respective product being marked with human-readable indicia for delivery to the use location, and marked with human-readable indicia for identification with at least one of the plurality of containers at the use location.

30. A system as in claim 28 wherein the selected said vendor order-processing computer receives less than all product-related information contained in the respective tag-response signal.

31. A system as in claim 28 wherein said vendor order-processing computer receives only the container identification from said host computer.

32. A system as in claim 28 wherein certain details of order replenishment shipments, initiated by said vendor order-processing computer, are shielded from said local computer and said host computer.

33. A system as in claim 21, a vendor order-processing computer receiving at least a portion of the tag signal response information, optionally through a host computer, said vendor order-processing computer storing, in memory, lot numbers and selected dates for selected shipments of replenishment product, and effecting shipment of a said replenishment order, said local computer, upon receipt of such shipment of said replenishment order communicating the lot number of the received product to the respective vendor order-processing computer, through the computer subsystem.

34. A system as in claim 21 wherein said computer subsystem further comprises a vendor order-processing computer which receives less than all of such tag response signal information from said host computer.

35. A system as in claim 34, said kiosk comprising an antenna assembly board, and a board opening extending through the antenna assembly board, said antenna body loop being mounted in said kiosk proximate said antenna board, and outwardly and proximate, said board opening and said chute opening, a speed control flap mounted to said antenna assembly board only adjacent a top of the board opening, and draping, without further control, downwardly over the board opening, said speed control flap being designed and configured to control speed of movement of said container when said container is tossed into said chute, while not barring any such movement, and wherein said container can be tossed through the board opening at any time with substantially simultaneous activation of the computer readable tag on the respective container, including said signal reader reading the computer readable tag while the so-tossed container is passing through said chute.

36. A system as in claim 20 wherein said computer readable tags remain mounted on said container through consumption of multiple replenishments of such consumable product from said container.

\* \* \* \* \*